US012672653B2

(12) United States Patent
Klupacs et al.

(10) Patent No.: US 12,672,653 B2
(45) Date of Patent: *Jul. 7, 2026

(54) PEST MANAGEMENT

(71) Applicant: Bio-Gene Technology Limited, Melbourne (AU)

(72) Inventors: Robert Klupacs, East Melbourne (AU); Peter May, Red Hill (AU)

(73) Assignee: Bio-Gene Technology Limited, Melbourne (AU)

( * ) Notice: Subject to any disclaimer, the term of this patent is extended or adjusted under 35 U.S.C. 154(b) by 44 days.

This patent is subject to a terminal disclaimer.

(21) Appl. No.: 16/629,187

(22) PCT Filed: Jul. 6, 2018

(86) PCT No.: PCT/AU2018/050702

§ 371 (c)(1),
(2) Date: Jan. 7, 2020

(87) PCT Pub. No.: WO2019/006514

PCT Pub. Date: Jan. 10, 2019

(65) Prior Publication Data

US 2021/0076675 A1 Mar. 18, 2021

(30) Foreign Application Priority Data

Jul. 7, 2017 (AU) ................................ 2017902664

(51) Int. Cl.

| | |
|---|---|
| ***A01N 35/06*** | (2006.01) |
| ***A01N 25/18*** | (2006.01) |
| ***A01N 47/18*** | (2006.01) |
| ***A01N 53/00*** | (2006.01) |
| ***A01N 57/12*** | (2006.01) |
| ***A01N 57/16*** | (2006.01) |

(52) U.S. Cl.

CPC ............. *A01N 35/06* (2013.01); *A01N 25/18* (2013.01); *A01N 47/18* (2013.01); *A01N 53/00* (2013.01); *A01N 57/12* (2013.01); *A01N 57/16* (2013.01)

(58) Field of Classification Search

CPC ........ A01N 35/06; A01N 47/18; A01N 53/00; A01N 57/12; A01N 57/16

See application file for complete search history.

(56) References Cited

U.S. PATENT DOCUMENTS

| | | | |
|---|---|---|---|
| 4,202,840 A | 5/1980 | Gray et al. | |
| 7,820,209 B2 | 10/2010 | Spooner-Hart et al. | |
| 2004/0110974 A1 | 6/2004 | Lilga et al. | |
| 2005/0070576 A1 | 3/2005 | Spooner-Hart et al. | |
| 2008/0234386 A1* | 9/2008 | Spooner-Hart ........ | A01N 65/10 514/659 |
| 2020/0323202 A1 | 10/2020 | Klupacs et al. | |

FOREIGN PATENT DOCUMENTS

| | | | |
|---|---|---|---|
| GB | 1467419 | A | 3/1977 |
| JP | 2003-055123 | A | 2/2003 |
| JP | 2016-535733 | A | 11/2016 |
| WO | WO 99/18802 | A1 | 4/1999 |
| WO | WO 02/089587 | A1 | 11/2002 |
| WO | WO 2011/013133 | A2 | 2/2011 |
| WO | WO 2015/061148 | A1 | 4/2015 |
| WO | WO 2017/221158 | A1 | 12/2017 |
| WO | WO 2019/006514 | A1 | 1/2019 |
| WO | WO 2019/006516 | A1 | 1/2019 |

OTHER PUBLICATIONS

Supplementary European Search Report in European Patent Application No. 18 82 7704.0 issued Oct. 23, 2020.

Australian Examination Report No. 1 issued in Australian Patent Application No. 2018295574 issued May 22, 2020.

May, P. "New β-triketone insecticides offer novel mode of action to control resistant insects" International Pest Control, Nov./Dec. 2016, vol. 58, issue 6, pp. 310-311.

Pino, J. A. et al., "Chemical composition and antibacterial activity of the essential oil of *Callistemon speciosus* (Sims) DC. leaves from Cuba" The Journal of Essential Oil Research, 2013, vol. 25, No. 5, pp. 418-422 (abstract only).

Costa, A.A., et al., 2017 "Repellent and Larvicidal Activity of the Essential Oil From *Eucalyptus nitens* Against *Aedes aegypti* and *Aedes albopictus* (Diptera: Culicidae)," Journal of Medical Entomology, 54(3): 670-676.

International Search Report in International Application No. PCT/AU2018/050702, dated Aug. 27, 2018.

Jeong, E-Y, et al., 2008 "Acaricidal Activity of Triketone Analogues Derived from Leptospermum Scoparium Oil Against House-Dust and Stored-Food Mites," *Pest Management Science,* 65(3): 327-331.

Kerr, R.W., 1951 "Adjuvants for Pyrethrins in Fly Sprays. I. The Adjuvant Action of Some Essential Oils and Other Materials From Australian Plants," Commonwealth Sci. Ind. Research Organization, Bull., No. 261, pp. 7-31, Chemical Abstracts Accession No. 2001:152622.

Park, C.G., et al., 2017 "Myrtaceae Plant Essential Oils and Their β-Triketone Components as Insecticides Against *Drosophila suzukii,*" Molecules, vol. 22, iss. 7, No. 1050, pp. 1-10.

Written Opinion in International Application No. PCT/AU2018/050702, dated Aug. 27, 2018.

Abderrahmane, K., et al., "Insecticide potency on alfalfa aphids of kanuka, ravintsara andtea tree essential oils and neem vegetable oil", Journal of Environmental Solutions (2012) vol. 1, Issue 1, pp. 16-22.

Bett, P. K. et al., 'Chemical composition of Cupressus lusitanica and Eucalyptus saligna leaf essential oils and bioactivity against major insect pests of stored food grains', Industrial Crops and Products, 2016, vol. 82, pp. 51-62.

(Continued)

*Primary Examiner* — Erin E Hirt

(74) *Attorney, Agent, or Firm* — Knobbe, Martens, Olson & Bear, LLP

(57) ABSTRACT

A method of controlling pests includes exposing the pests to a pest controlling amount of a triketone compound in combination with at least one second pesticide. Formulations and kits can include the combination.

14 Claims, 11 Drawing Sheets

(56) References Cited

OTHER PUBLICATIONS

Daglish, Gregory J., et al., "Impact of resistance on the efficacy of binary combinations of Spinosad, chlorpyrifos-methyl and s-methoprene against five stored-grain beetles," Journal of Stored Products Research 44 (2008) 71-76.
Daglish, Gregory J., et al., "Implications of Methoprene resistance for managing Rhyzopertha dominica (F.) in stored gain," Journal of Stored Products Research 54 (2013) 8-12.
Elzinga, Dezi A., et al., "Suppression of plant defenses by a *Myzus persicae* (green peach aphid) salivary effector protein", Mol Plant Microbe Interact, Jul. 2014; 277): 747-756.
Fang, F. et al., 'In vitro activity of ten essential oils against Sarcoptes scabiei', Parasites & Vectors, 2016, vol. 9, article No. 594, pp. 1-7.
Greene, T. et al. 'Antiparasitic behavior in New Zealand parakeets', NOTORNIS Journal of the Ornithological Society of New Zealand, Dec. 1989, vol. 36, part 4, pp. 322-323.
Ikeura, H. et al. "Repellent Effect of Herb Extracts on the Population of Wingless GreenPeach Aphid, *Myzus persicae* Sulzer (Hempiptera: Aphididae)", Journal of Agricultural Science (2012) vol. 4, No. 5, pp. 139-144.
Rani, P.U., "Systemic toxicity of different plant derived chemicals and essential oils against safflower aphid, *Uroleucon carthami* (Homoptera Aphididae)", Indian Journal of Entomology (2004) vol. 66, No. 4, pp. 345-348.
Sameza, M.L., et al., "Potential use of Eucalyptus globulus essential oil against Phytophthora colocasiae the causal agent of taro leaf blight", European Journal of Plant Pathology (2014) vol. 140, pp. 243-250.
SBS News, "Eucalyptus extract a weapon against Zika", Aug. 4, 2016, XP055835323, Retrieved from the World-Wide-Web at: sbs.com.au/news/eucalyptus-extract-a-weapon-against-zika.
Sparks, Thomas C. and Nauen, Ralf, "IRAC: Mode of action classification and insecticide resistance management," Pesticide Biochemistry and Physiology, 121 (2015), pp. 122-128.
Spooner-Hart, Robert Neil, PhD Thesis "Investigations on Essential Oils of Selected Australian Flora, in Particular Those Containing β-Triketones, for Activity Against Arthropods", School of Science and Health, University of Western Sydney, Mar. 2013.
Thomas, J. et al., 'Evaluation of Repellent Properties of Volatile Extracts From the Australian Native Plant *Kunzea ambigua* Against Aedes aegypti (Diptera: Culcidae)', Journal of Medical Entymology, 2009, vol. 46, iss. 6, pp. 1387-1391.
Chinese Decision on Rejection in CN Patent Application No. 201880058147.2 dated Feb. 23, 2022.
Chen et al, "Study on the screening method for optimal synergetic ratio of combined pesticides" ACTA Phytophylacica Sinica, vol. 27, No. 4, Dec. 2000, pp. 349-354.
Gu, Zhongyan, "Qualitative and quantitative analysis of synergism of pesticide compounding", Jiangsu Agricultural Sciences, 1990, No. 3, pp. 31-34.
Ning, Qianji, et al., "Synergism of mixed insecticides on the newly-hatched nymphs of *Periplaneta americana*", Pesticides; 36(3), pp. 14-15 (1997).
Examination Report No. 1 issued in corresponding New Zealand Patent Application No. 760403, dated Aug. 30, 2022, (in 7 pages).
Office Action in corresponding Japanese Patent Application No. 2020-522757, dated Jul. 26, 2022, (in 7 pages).
Anderson, J.A. et al., "Acetylcholinesterase inhibition by nootkatone and carvacrol in arthropods", Pesticide Biochemistry and Physiology, 2012, vol. 102, pp. 124-128.
Joca, H.C. et al., "Carvacrol modulates voltage-gated sodium channels kinetics in dorsal root ganglia", European Journal of Pharmacology, 2015, vol. 756, pp. 22-29.
Negahban, M et al., "Fumigant toxicity of *Eucalyptus intertexta, Eucalyptus sargentii* and *Eucalyptus camaldulensis* against stored-product beetles", J. Appl. Entomol. [2007] 131(4), 256-261.
Park, C.G. et al., "Myrtaceae Plant Essential Oils and their β-Triketone Components as Insecticides against *Drosophila suzukii*", Molecules, 2017, 22(7), pp. 1050 (in 10 pages).

* cited by examiner

PEST MANAGEMENT

FIELD OF THE INVENTION

The present invention relates to a method of controlling pests comprising exposing said pests to a pest controlling amount of a triketone compound in combination with at least one second pesticide. Formulations and kits comprising the combination are also described.

BACKGROUND OF THE INVENTION

Synthetic insecticides and arachnicides having varying modes of action have been used for decades to control insects and arachnid pests respectively. A number of problems are associated with synthetic insecticides and arachnicides including toxicity to other beneficial insects, arachnids and animals or humans, non-biodegradability, environmental persistence, contamination of waterways and development of resistance in the target pest population.

Resistance in target pest populations and toxicity to other populations or to the environmental have led to a number of pesticides being used less or not at all. This has reduced the number of pesticides available to control pests such as insects and arachnids.

There is a constant need for new and alternative pest management methods to address at least some of the problems above and which may provide further pest management options for users.

Pest management systems may include combinations of insecticides or arachnicides, particularly combinations of insecticides or arachnicides that have different modes of action. Such combinations may allow a reduced amount of one or more insecticides or arachnicides to be used, reducing at least some of the problems above while providing effective pest control.

WO 2002/089587 discloses naturally occurring β-diketones and β-triketones such as flavesone and its derivatives as effective pesticides, including insecticides and arachnicides. However, there is an advantage in using the least amount of pesticide possible or combinations of pesticides that allow minimum amount of each pesticide to be used.

The present invention is predicated at least in part on the discovery that flavesone has a unique mode of action being a potassium channel activator and is therefore surprisingly useful in combinations of pesticides. The present invention is also predicated at least in part on the discovery that combinations of flavesone and another insecticide, permethrin, were effective in controlling insects.

SUMMARY OF THE INVENTION

In one aspect, the present invention provides a method of controlling pests comprising exposing the pests to a combination of a compound of formula (I):

(I)

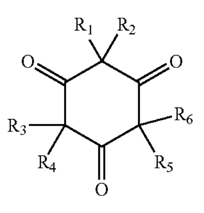

wherein $R_1$ is selected from —C(=O)$R_7$, —O$R_8$, —S$R_8$, —$C_{1-10}$hydroxyalkyl, —N$R_9R_{10}$, —C(=N—$R_9$)$R_7$, —C(=N—OH)$R_7$, —NO, —$NO_2$, —N(O$R_8$)$R_7$ and —O$SO_3R_8$;

$R_2$ is selected from hydrogen, —$C_{1-10}$alkyl, —$C_{2-10}$alkenyl, aryl and heteroaryl;

$R_3$, $R_4$, $R_5$ and $R_6$ are each independently selected from hydrogen, —$C_{1-10}$alkyl, —$C_{3-6}$cycloalkyl, —$C_{2-10}$alkenyl, —$C_{1-10}$haloalkyl, —$C_{1-10}$dihaloalkyl, —$C_{1-10}$trihaloalkyl, —O$R_8$, —S$R_8$, —N$R_9R_{10}$, —C(=N—$R_9$)$R_7$, —NO, —$NO_2$, —N$R_9$O$R_8$, —O$SO_3R_8$, —$C_{1-10}$alkylaryl and —C(=O)$R_7$;

$R_7$ is selected from hydrogen, —$C_{1-10}$alkyl, —$C_{2-10}$alkylaryl, $C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl, —$C_{1-10}$nitroalkyl, —$C_{1-3}$alkylO$C_{1-3}$alkyl, —$C_{1-3}$alkylO$C_{1-3}$haloalkyl, —$C_{1-3}$alkylO$C_{1-3}$dihaloalkyl, —$C_{1-3}$alkylO$C_{1-3}$trihaloalkyl, —O$R_8$, —S$R_8$ and —N$R_9R_{10}$;

$R_8$ is selected from hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl and —$C_{1-10}$nitroalkyl;

$R_9$ and $R_{10}$ are independently selected from hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl; or a tautomer thereof;

and at least one second pesticide.

In another aspect of the invention there is provided a pesticidal composition comprising a compound of formula (I) and described above and at least one second pesticide.

In a further aspect of the invention there is provided a kit comprising a compound of formula (I) as described above and at least one second pesticide.

DETAILED DESCRIPTION OF THE INVENTION

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "an element" means one element or more than one element.

As used herein, the term "about" refers to a quantity, level, value, dimension, size, or amount that varies by as much as 30%, 25%, 20%, 15% or 10% to a reference quantity, level, value, dimension, size, or amount.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The term "combination" as used herein refers to the compound of formula (I) and at least one second pesticide being used simultaneously in a single composition or separate compositions or sequentially in separate compositions, such that the biological activity of each of the compounds in the pest overlaps or occurs at the same time.

The term "controlling" as used herein refers to preventing infestation with pests such as insects and arachnids, repelling pests from an environment, combatting, eradicating or destroying pests, including increasing the mortality of the pests or inhibiting the growth and/or development of the pests.

As used herein, the term "environment" refers to an environment in which the combination of compounds may be applied to ensure that the pest is exposed to the combination of compounds. The environment may be an agricultural environment, a household environment, an industrial environment or another environment that hosts or potentially hosts pests. An agricultural environment includes environments for growing crops, trees and other plants of commercial importance that may be susceptible to infestation. The agricultural environment includes not only the plant itself but also the soil and area around the plants as they grow and also areas where part of plants, for example, seeds, grains, leaves, roots or fruit, may be stored. A household environment includes environments inhabited by humans or animals and may include an indoor environment, such as carpets, curtains, cupboards and the air inside a house. A household environment may also include domestic gardens. An industrial environment includes environments which are used for industrial purposes such as manufacture, storage or vending of products. Industrial environments include warehouses, manufacturing plants, shops, storage facilities and the like. Other environments may include leisure areas such as parks and stadiums or water areas such as rivers, lakes, ponds or where water may collect or be slow moving or stagnant.

As used herein, the term "alkyl" refers to a straight chain or branched saturated hydrocarbon group having 1 to 10 carbon atoms. Where appropriate, the alkyl group may have a specified number of carbon atoms, for example, $C_{1-6}$alkyl which includes alkyl groups having 1, 2, 3, 4, 5 or 6 carbon atoms in a linear or branched arrangement. Examples of suitable alkyl groups include, but are not limited to, methyl, ethyl, n-propyl, i-propyl, n-butyl, i-butyl, t-butyl, n-pentyl, 2-methylbutyl, 3-methylbutyl, 4-methylbutyl, n-hexyl, 2-methylpentyl, 3-methylpentyl, 4-methylpentyl, 5-methylpentyl, 2-ethylbutyl, 3-ethylbutyl, heptyl, octyl, nonyl and decyl.

As used herein, the term "alkenyl" refers to a straight-chain or branched hydrocarbon group having one or more double bonds between carbon atoms and having 2 to 10 carbon atoms. Where appropriate, the alkenyl group may have a specified number of carbon atoms. For example, $C_2$-$C_6$ as in "$C_2$-$C_6$alkenyl" includes groups having 2, 3, 4, 5 or 6 carbon atoms in a linear or branched arrangement. Examples of suitable alkenyl groups include, but are not limited to, ethenyl, propenyl, isopropenyl, butenyl, butadienyl, pentenyl, pentadienyl, hexenyl, hexadienyl, heptenyl, octenyl, nonenyl and decenyl.

As used herein, the term "cycloalkyl" refers to a saturated cyclic hydrocarbon. The cycloalkyl ring may include a specified number of carbon atoms. For example, a 3 to 6 membered cycloalkyl group includes 3, 4, 5 or 6 carbon atoms. Examples of suitable cycloalkyl groups include, but are not limited to, cyclopropyl, cyclobutyl, cyclopentyl and cyclohexyl.

As used herein, the term "aryl" is intended to mean any stable, monocyclic, bicyclic or tricyclic carbon ring system of up to 7 atoms in each ring, wherein at least one ring is aromatic. Examples of such aryl groups include, but are not limited to, phenyl, naphthyl, tetrahydronaphthyl, indanyl, fluorenyl, phenanthrenyl, biphenyl and binaphthyl.

The term "heteroaryl" as used herein, represents a stable monocyclic, bicyclic or tricyclic ring of up to 7 atoms in each ring, wherein at least one ring is aromatic and at least one ring contains from 1 to 4 heteroatoms selected from the group consisting of O, N and S. Heteroaryl groups within the scope of this definition include, but are not limited to, acridinyl, carbazolyl, cinnolinyl, quinoxalinyl, quinazolinyl, pyrazolyl, indolyl, isoindolyl, 1H,3H-1-oxoisoindolyl, benzotriazolyl, furanyl, thienyl, thiophenyl, benzothienyl, benzofuranyl, benzodioxane, benzodioxin, quinolinyl, isoquinolinyl, oxazolyl, isoxazolyl, imidazolyl, pyrazinyl, pyridazinyl, pyridinyl, pyrimidinyl, pyrrolyl, tetrahydroquinolinyl, thiazolyl, isothiazolyl, 1,2,3-triazolyl, 1,2,4-triazolyl, 1,2,4-oxadiazolyl, 1,2,4-thiadiazolyl, 1,3,5-triazinyl, 1,2,4-triazinyl, 1,2,4,5-tetrazinyl and tetrazolyl. Particular heteroaryl groups have 5- or 6-membered rings, such as pyrazolyl, furanyl, thienyl, oxazolyl, indolyl, isoindolyl, 1H,3H-1-oxoisoindolyl, isoxazolyl, imidazolyl, pyrazinyl, pyridazinyl, pyridinyl, pyrimidinyl, pyrrolyl, thiazolyl, isothiazolyl, 1,2,3-triazolyl, 1,2,4-triazolyl and 1,2,4-oxadiazolyl and 1,2,4-thiadiazolyl.

The term "haloalkyl" as used herein refers to an alkyl group in which one or more hydrogen atoms of the alkyl group is replaced with a halo atom. Where appropriate, the alkyl group may have a specified number of carbon atoms, for example, $C_{1-6}$haloalkyl which includes haloalkyl groups having 1, 2, 3, 4, 5 or 6 carbon atoms in a linear or branched arrangement. Examples of haloalkyl groups include fluoromethyl, difluoromethyl, trifluoromethyl, 1-fluoroethyl, 2-fluoroethyl, 1,1-difluoroethyl, 2,2-fluoroethyl, 1,1,2-trifluoroethyl, 2,2,2-trifluoroethyl, 3-fluoropropyl, 3,3-difluoropropyl, 3,3,3-trifluoropropyl, 4-fluorobutyl, 4,4-difluorobutyl, 4,4,4-trifluorobutyl, 5-fluoropentyl, 5,5-difluoropentyl, 5,5,5-trifluoropentyl, 6-fluorohexyl, 6,6-difluorohexyl or 6,6,6-trifluorohexyl, chloromethyl, dichloromethyl, trichloromethyl, 1-chloroethyl, 2-chloroethyl, 1,1-dichloroethyl, 2,2-chloroethyl, 1,1,2-trichloroethyl, 2,2,2-trichloroethyl, 3-chloropropyl, 3,3-dichloropropyl, 3,3,3-trichloropropyl, 4-chlorobutyl, 4,4-dichlorobutyl, 4,4,4-trichlorobutyl, 5-chloropentyl, 5,5-dichloropentyl, 5,5,5-trichloropentyl, 6-chlorohexyl, 6,6-dichlorohexyl or 6,6,6-trichlorohexyl, bromomethyl, dibromomethyl, tribromomethyl, 1-bromoethyl, 2-bromoethyl, 1,1-dibromoethyl, 2,2-dibromoethyl, 1,1,2-tribromoethyl, 2,2,2-tribromoethyl, 3-bromopropyl, 3,3-dibromopropyl, 3,3,3-tribromopropyl, 4-bromobutyl, 4,4-dibromobutyl, 4,4,4-tribromobutyl, 5-bromopentyl, 5,5-dibromopentyl, 5,5,5-tribromopentyl, 6-bromohexyl, 6,6-dibromohexyl or 6,6,6-tribromohexyl and the like.

"Halo" as used herein refers to fluoro, chloro, bromo and iodo.

The terms "hydroxyalkyl", "thioalkyl" and "nitroalkyl" each refer to an alkyl group as defined above in which one hydrogen atom has been replaced by a hydroxyl group, a thiol group or a nitro group respectively.

The term "alkoxy" as used herein refers to an oxygen substituent that is substituted with an alkyl group as defined above. Examples of suitable alkoxy groups include, but are not limited to, $—OCH_3$, $—OCH_2CH_3$, $—O(CH_2)_2CH_3$, $—OCH(CH_3)_2$, $—O(CH_2)_3CH_3$, $—OCH_2CH(CH_3)_2$, $—OC(CH_3)_3$, $—O(CH_2)_4CH_3$ and $—O(CH_2)_5(CH_3)$.

The compounds of formula (I) may exist in a number of tautomeric forms. For example, tautomerism is shown in the scheme below:

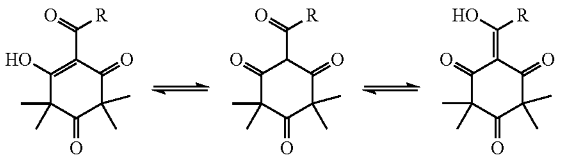

It is intended that all such tautomeric structures are included with in the scope of formula (I).

It is also possible that the compounds for formula (I) may exist in stereoisomeric form. The compounds may be enantiomers or diastereomers and may be present as an individual isomer or in mixture form, including racemic mixtures.

Methods of the Invention

In one aspect, the present invention provides a method of controlling pests comprising exposing the pests to a combination of a compound of formula (I):

(I)

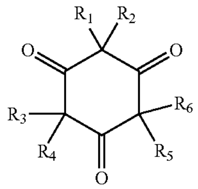

wherein $R_1$ is selected from $—C(=O)R_7$, $—OR_8$, $—SR_8$, $—C_{1-10}$hydroxyalkyl, $—NR_9R_{10}$, $—C(=N—R_9)R_7$, $—C(=N—OH)R_7$, —NO, $—NO_2$, $—N(OR_8)R_7$ and $—OSO_3R_8$;

$R_2$ is selected from hydrogen, $—C_{1-10}$alkyl, $—C_{2-10}$alkenyl, aryl and heteroaryl;

$R_3$, $R_4$, $R_5$ and $R_6$ are each independently selected from hydrogen, $—C_{1-10}$alkyl, $—C_{3-6}$cycloalkyl, $—C_{2-10}$alkenyl, $—C_{1-10}$haloalkyl, $—C_{1-10}$dihaloalkyl, $—C_{1-10}$trihaloalkyl, $—OR_8$, $—SR_8$, $—NR_9R_{10}$, $—C(=N—R_9)R_7$, —NO, $—NO_2$, $—NR_9OR_8$, $—OSO_3R_8$, $—C_{1-10}$alkylaryl and $—C(=O)R_7$;

$R_7$ is selected from hydrogen, $—C_{1-10}$alkyl, $—C_{2-10}$alkylaryl, $C_{3-6}$cycloalkyl, $—C_{2-10}$alkenyl, $—C_{1-10}$alkylheteroaryl, $—C_{1-10}$haloalkyl, $—C_{1-10}$dihaloalkyl, $—C_{1-10}$trihaloalkyl, $—C_{1-10}$haloalkoxy, $—C_{1-10}$hydroxyalkyl, $—C_{1-10}$thioalkyl, $—C_{1-10}$nitroalkyl, $—C_{1-3}$alkyl$OC_{1-3}$alkyl, $—C_{1-3}$alkyl$OC_{1-3}$haloalkyl, $—C_{1-3}$alkyl$OC_{1-3}$dihaloalkyl, $—C_{1-3}$alkyl$OC_{1-3}$trihaloalkyl, $—OR_8$, $—SR_8$ and $—NR_9R_{10}$;

$R_8$ is selected from hydrogen, $—C_{1-10}$alkyl, $—C_{2-10}$alkylaryl, $—C_{3-6}$cycloalkyl, $—C_{2-10}$alkenyl, $—C_{1-10}$alkylheteroaryl, $—C_{1-10}$haloalkyl, $—C_{1-10}$dihaloalkyl, $—C_{1-10}$trihaloalkyl, $—C_{1-10}$haloalkoxy, $—C_{1-10}$hydroxyalkyl, $—C_{1-10}$thioalkyl and $—C_{1-10}$nitroalkyl;

$R_9$ and $R_{10}$ are independently selected from hydrogen, $—C_{1-10}$alkyl, $—C_{2-10}$alkylaryl, $—C_{3-6}$cycloalkyl, $—C_{2-10}$alkenyl, $—C_{1-10}$alkylheteroaryl, $—C_{1-10}$haloalkyl, $—C_{1-10}$dihaloalkyl, $—C_{1-10}$trihaloalkyl; or a tautomer thereof; and at least one second pesticide.

In some embodiments, the compound of formula (I) is a compound of formula (II):

(II)

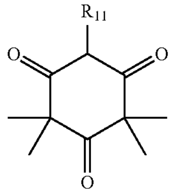

wherein $R_{11}$ is selected from $—CR_{12}R_{13}R_{14}$ or $—NR_{15}R_{16}$;

one of $R_{12}$ and $R_{13}$ is hydrogen and the other is hydroxyl or $—OCR_{17}R_{18}R_{19}$ or $R_{12}$ and $R_{13}$ together form an oxo group (=O) or a =N—OH group;

$R_{14}$ is $—CH(CH_3)CR_{20}R_{21}R_{22}$, $—CH_2CH(CH_3)CR_{20}R_{21}R_{22}$ or $—CH(CH_3)CH_2CR_{20}R_{21}R_{22}$;

$R_{15}$ and $R_{16}$ are independently selected from hydrogen and $C_{1-10}$alkyl;

$R_{17}$, $R_{18}$ and $R_{19}$ are independently selected from hydrogen or halo; and $R_{20}$, $R_{21}$ and $R_{22}$ are independently selected from hydrogen, hydroxyl, halo, $NO_2$ and $—OCR_{17}R_{18}R_{19}$; or a tautomer thereof.

In some embodiments, the compound of formula (I) is a compound of formula (III):

(III)

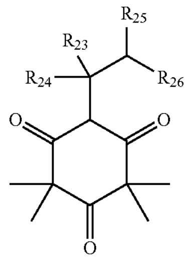

wherein one of $R_{23}$ and $R_{24}$ is hydrogen and the other is hydroxyl or $—OCR_{27}R_{28}R_{29}$ or $R_{23}$ and $R_{24}$ together form an oxo group (=O);

$R_{25}$ is $—CR_{30}R_{31}R_{32}$, $—CH_2CR_{30}R_{31}R_{32}$ or $—CH(CH_3)CR_{30}R_{31}R_{32}$;

$R_{26}$ is H or $—CH_3$; wherein where $R_{26}$ is H, $R_{25}$ is $—CH(CH_3)CR_{30}R_{31}R_{32}$;

$R_{27}$, $R_{28}$ and $R_{29}$ are independently selected from hydrogen or halo; and $R_{30}$, $R_{31}$ and $R_{32}$ are independently selected from hydrogen, hydroxyl, halo, $NO_2$ and $—OCR_{27}R_{28}R_{29}$; or a tautomer thereof.

In some embodiments, the compound of formula (I) is selected from:

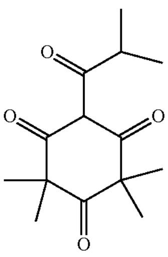 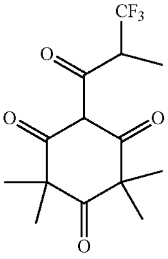 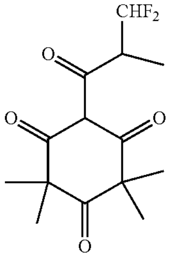
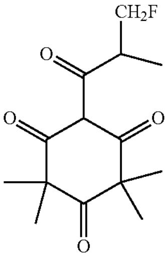 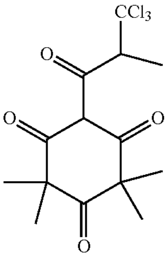 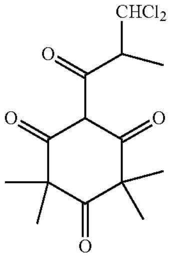
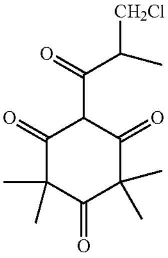 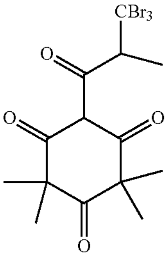 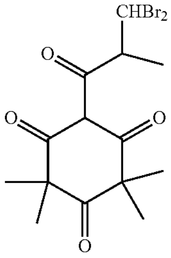
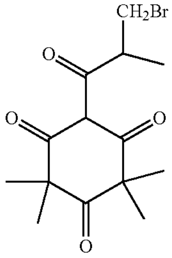 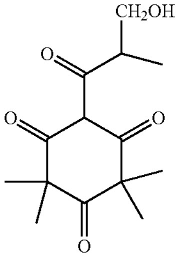 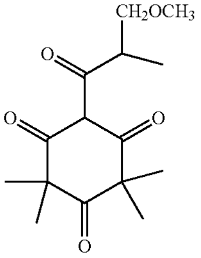
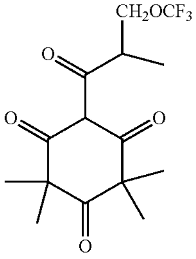 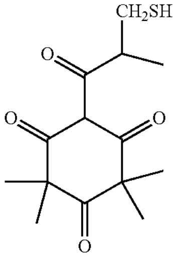 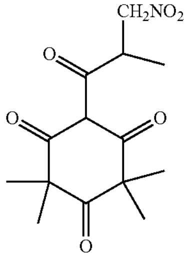
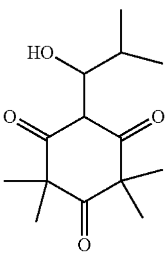 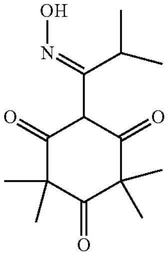 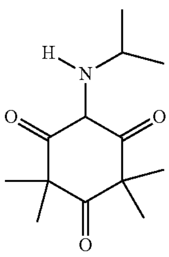
-continued
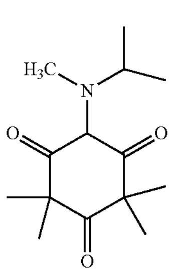 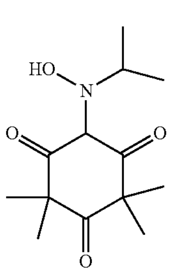 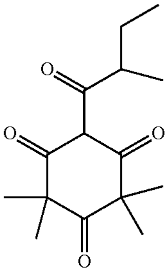
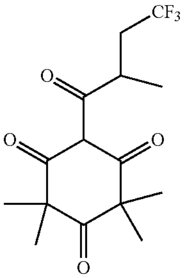 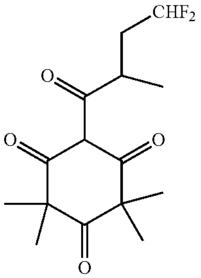
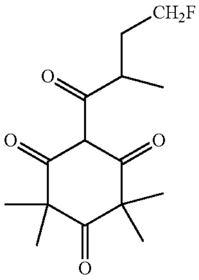 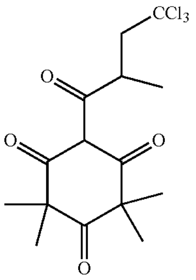
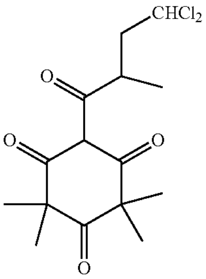 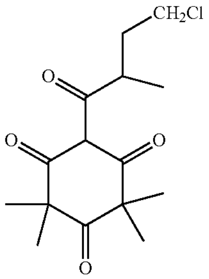
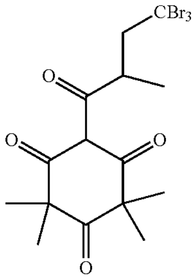 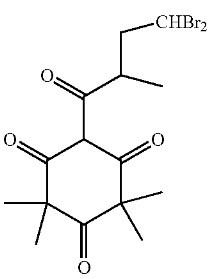
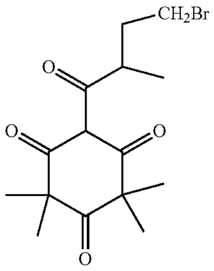 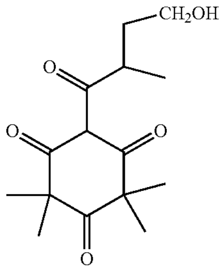

-continued
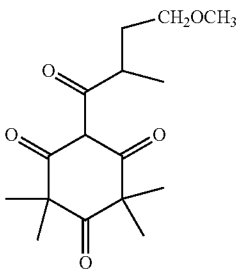
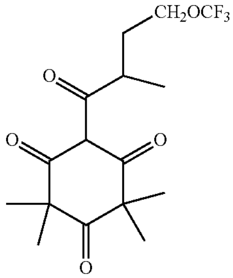
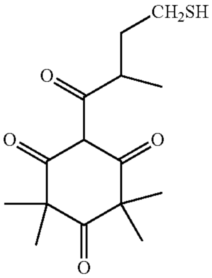
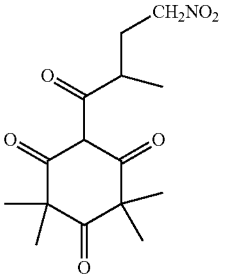
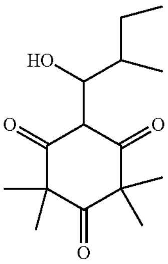
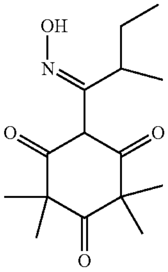
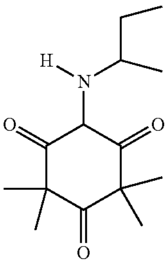
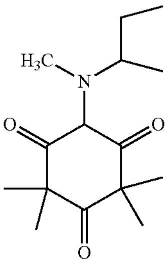
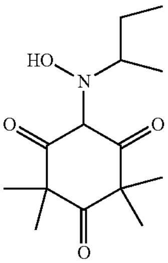
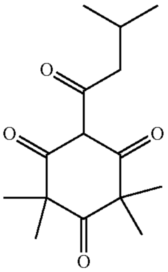
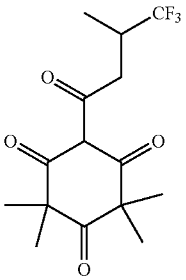
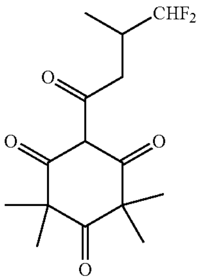
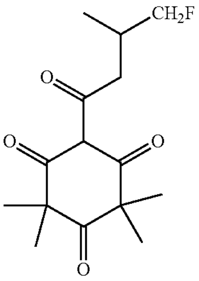
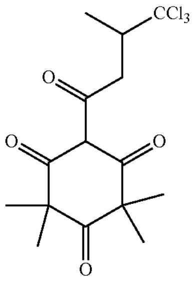
-continued
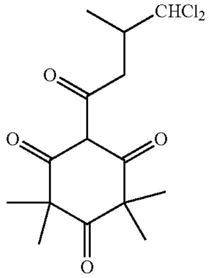
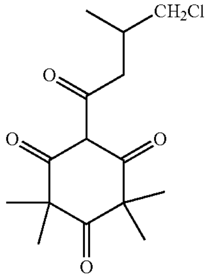
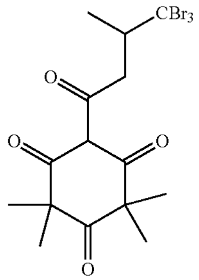
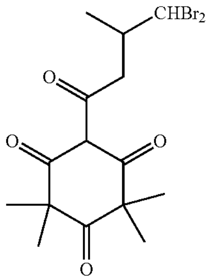
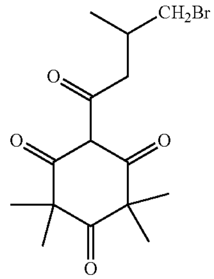
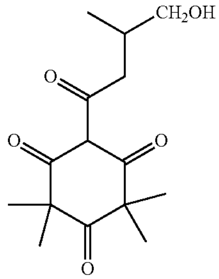
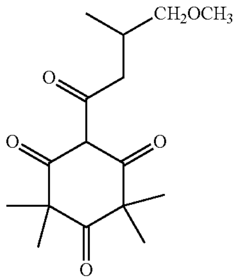
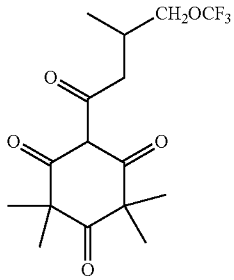
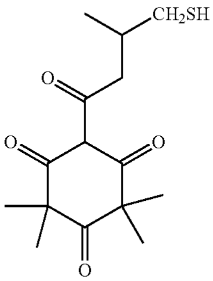
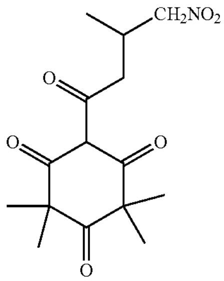
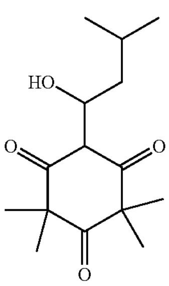
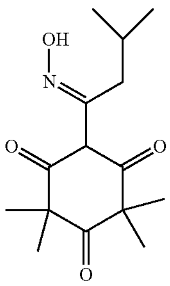
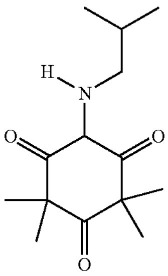

-continued

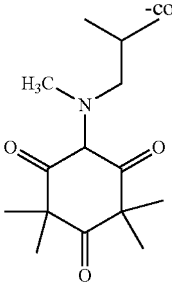

and

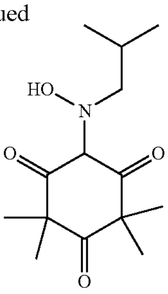

or a tautomer thereof.

In particular embodiments, the compound of formula (I) is flavesone, 1-isobutyroyl-3,3,5,5-tetramethylcyclohexan-2,4,6-trione:

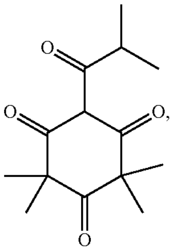

Leptospermone (1-valeroyl-3,3,5,5-tetramethylcyclohexane-2,4,6-trione):

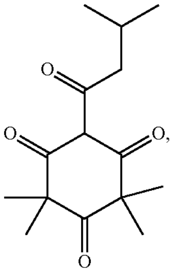

or isoleptospermone (1-isovalerovl-3,3,5,5-tetramethylcyclohexane-2,4,6-trione):

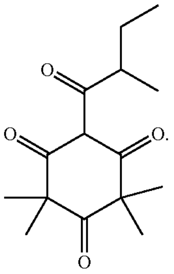

The combinations of the present invention suitable include a compound of formula (I) and at least one second pesticide having a different mode of action from the compound of formula (I). The compounds of formula (I) are activators of potassium ion channels as shown in Example 2. Suitable second pesticides include insecticides and arachnicides with varying modes of action.

In some embodiments, the pests to be controlled are selected from insects and arachnids. In some embodiments, the pest is an insect. In other embodiments, the pest is an arachnid, especially a tick or a mite.

In some embodiments, the at least one second pesticide is at least one insecticide. In some embodiments, the at least one second insecticide comprises a sodium channel modulator such as pyrethroid, DDT and methoxychlor. Suitable pyrethroids include acrinathrin, allethrin, bifenthrin, bioallethrin, bioallethrin-S-cyclopentyl, bioresmethrin, cycloprothrin, cyfluthrin, β-cyfluthrin, cyhalothrin, γ-cyhalothrin, λ-cyhalothrin, cypermethrin, α-cypermethrin, β-cypermethrin, θ-cypermethrin, ζ-cypermethrin, cyphenothrin, deltamethrin, dimefluthrin, empenthrin, esfenvalerate, etofenprox, fenpropathrin, fenvalerate, flucythrinate, flumethrin, fluvalinate, tau-fluvalinate, halfenprox, imiprothrin, metofluthrin, permethrin, phenothrin, prallethrin, profluthrin, pyrethrin (pyrethrum), resmethrin, RU15525, silafluofen, tefluthrin, tetramethrin, tralomethrin, transfluthrin and ZX18901.

In some embodiments, the at least one second insecticide comprises an acetylcholinesterase (AChE) inhibitor such as a carbamate or an organophosphate. Suitable carbamates include alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb and xylylcarb. Suitable organophosphates include acephate, azamethiphos, azinphos, azinphos-methyl, azinphos-ethyl, cadusafos, chlorethoxyfos, chlorfenvinfos, chlormephos, chlorpyrifos, chlorpyrifos-methyl, coumaphos, cyanophos, demeton-S-methyl, diazinon, dichlorvos, dicrotophos, dimethoate, dimethylvinphos, disulfoton, ethion, ethoprophos, famphur, fenamiphos, fenitrothion, fenthion, fosthiazate, heptenophos, isofenphos, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos, pirimiphos-methyl, profenfos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

In some embodiments, the at least one second insecticide comprises a GABA-gated chloride channel antagonist such as an organochloride or a fiprole. Suitable organochlorides include chlordane, endosulfan and α-enosulfun. Suitable fiproles include ethiprole, fipronil, pyrafluprole, and pyriprole.

In some embodiments, the at least one second insecticide comprises a nicotinergic acetylcholine receptor agonist such as nicotine or a chloronicotinyl compound. Suitable chloronicotinyl compounds include acetamiprid, clothianidin, dinotefuran, imidacloprid, nitenpyram, thiocloprid and thiamethoxam.

In some embodiments, the at least one second insecticide comprises an allosteric acetylcholine receptor modulator such a spinetoram or spinosad.

In some embodiments, the at least one second insecticide comprises a chloride channel actuator such as abamectin, emamectin benzoate, lepimectin or milbemectin.

In some embodiments, the at least one second insecticide comprises a juvenile hormone mimic selected from hydroprene, kinoprene, methoprene, S-methoprene fenoxycarb or pyriproxyfen.

In some embodiments, the at least one second insecticide comprises a homopteran feeding blocker such as pymetrozine or flanicamid.

In some embodiments, the at least one second insecticide comprises a mitochondrial ATP synthase inhibitor such as diafenthiuron or tetradifan.

In some embodiments, the at least one second insecticide comprises an uncoupler of oxidative phosphorylation such as chlorfenapyr or DNOC.

In some embodiments, the at least one second insecticide comprises a nicotinic acetylcholine receptor channel blocker such as bensultap, cartap hydrochloride, thiocyclam or thiosultap-sodium.

In some embodiments, the at least one second insecticide comprises an inhibitor of chitin biosynthesis such as a benzoylurea or buprofezin. Suitable benzoylureas include bistrifluron, chlorfluazuron, diflubenzuron, flucycloxuron, flufenoxuron, hexaflumuron, lufenuron, novaluron, noviflumuron, penfluron, teflubenzuron or triflumuron.

In some embodiments, the at least one second insecticide comprises a moulting disruptor such as cyromazine.

In some embodiments, the at least one second insecticide comprises an ecdysone receptor agonist or disruptor such as a diacylhydrazine. Suitable diacylhydrazines include chromafenozide, halofenozide, methoxyfenozide or tebufenozide.

In some embodiments, the at least one second insecticide comprises an octopamine receptor agonist such as amitraz.

In some embodiments, the at least one second insecticide comprises a mitochondrial complex I electron transport inhibitor such as hydramethylnon, acequinocyl and fluacrypryrim.

In some embodiments, the at least one second insecticide comprises an acetyl CoA carboxylase inhibitor such as a tetronic acid derivative or a tetramic acid derivative. Suitable tetronic acid derivatives include spirodiclofen and spiromesfen and a suitable tetramic acid derivative is spirotetramat.

In some embodiments, the at least one second insecticide comprises a voltage-dependent sodium channel blocker such as indoxacarb or metaflumizone.

In some embodiments, the at least one second insecticide comprises a mitochondrial complex IV electron inhibitor such as a phosphine or cyanide. Suitable phosphines include zinc phosphide, aluminium phosphide, calcium phosphide or phosphine.

In some embodiments, the at least one second insecticide comprises a mitochondrial complex IV electron transport inhibitor such as cyenopyrafen.

In some embodiments, the at least one second insecticide comprises a ryanodine receptor modulator such as chloranthraniliprole, cyantraniliprole and flubendiamide.

In particular embodiments, the at least one second insecticide comprises a sodium channel modulator, more particularly a pyrethroid, even more particularly pyrethrin, permethrin, bifenthrin, cyfluthrin, cypermethrin, deltamethrin or transfluthrin, most especially permethrin.

In other embodiments, the at least one second pesticide is an arachnicide, expecially an acaricide. In some embodiments, the at least one second arachnicide is selected from abamectin, acequinocyl, acrinathrin, aldicarb, alpha-cypermethrin, amidithion, amiton, amitraz, aramite, arsenous oxide, azinphos-ethyl, azinphos-methyl, azobenzene, azocyclotin, azothoate, benomyl, benzoximate, benzylbenzoate, bifenazate, bifenthrin, binapacryl, bromocyclen, bromophos, bromophos-ethyl, bromopropylate, butocarboxim, camphechlor, carbanolate, carbaryl, carbofuran, carbophenothion, carvacrol, chinomethionat, chlorbenside, chlordimeform, chlorfenapyr, chlorfenethol, chlorfenson, chlorfensulphide, chlorfenvinphos, chlorobenzilate, chloromebuform, chloromethiuron, chloropropylate, chlorpyrifos, chlorthiophos, clofentezine, closantel, coumaphos, crotamiton, crotoxyphos, cyanthoate, cycloprate, cyenopyrafren, cyflumetofen, cyhalothrin, cyhexatin, cypermethrin, cyromazine, DDT, demeton, demeton-methyl, demeton-O, demeton-O-methyl, demeton-S, demeton-S-methyl, diafenthiuron, dialifos, diazinon, dichlofluanid, dichlorvos, dicofol, dieldrin, dienochlor, diflovidazin, dimefox, dimethoate, dinex, dinobuton, dinocap, dinocton, dinopenton, dinosulfon, dinoterbon, dioxathion, diphenyl sulfone, disulfoton, DNOC, endosulfan, endothion, ethion, ethoate-methyl, etoxazole, fenazaflor, fenazaquin, fenbutatin oxide, fenothiocarb, fenpropathrin, fenpyroximate, fenson, fentrifanil, fenvalerate, fipronil, fluacrypyrim, fluazuron, flubenzimine, flucycloxuron, flucythrinate, fluenetil, flufenoxuron, flumethrin, fluorbenside, fluvalinate, formetanate, formothion, formparanate, genit, halfenprox, heptenophos, hexachlorophene, hexythiazox, isocarbophos, lindane, malathion, mecarbam, methacrifos, methamidophos, methiocarb, metolcarb, mevinphos, milbemectin, mipafox, monocrotophos, naled, nifluridide, omethoate, oxamyl, oxydeprofos, oxydisulfoton, parathion, permethrin, phenkapton, phorate, phosalone, phosmet, phoxim, pirimiphos-methyl, propargite, propetamphos, propoxur, prothidathion, prothoate, pyridaben, pyrimidifen, quinalphos, quintiofos, schradan, sophamide, spirodiclofen, sulfluramid, sulfotep, sulfur, tau-fluvalinate, tebufenpyrad, TEPP, tetrachlorvinphos, tetradifon, tetrasul, thiocarboxime, thiofanox, thiometon, thioquinox, thuringiensin, triarathene, triazophos, trichlorfon and vamidothion.

In some embodiments, one second pesticide, such as an insecticide or arachnicide, is used. In other embodiments, more than one second pesticide is used, for example two second insecticides or arachnicides such that the combination comprises three insecticides.

The compounds of formula (I) may be isolated from oil bearing trees such as trees from the Myrtaceae family such as *Leptospermum scoparium, Eucalyptus grandis* and *Eucalyptus cloeziana*, especially *Leptospermum scoparium.*

In other embodiments, the compound of formula (I) may be prepared synthetically for examples as described in WO 2002/089587. For example, 1,3,5-trihydroxybenzene may be reacted with RCN in the presence of zinc chloride (Blatt, Org. Synth. Col 11, 1943, 522-523) as shown in scheme 1:

Scheme 1

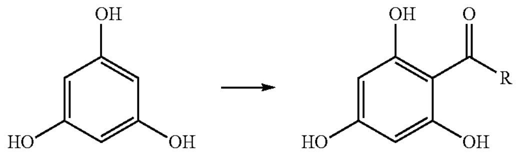

Anhydrous methyl iodide (6 Eq) is slowly added to the 1-acyl-2,4,6-trihydroxybenzene (1 eq) and sodium ethoxide (6 eq) in anhydrous methanol as shown in scheme 2 to afford the 1-acyl-3,3,5,5-tetramethyl-2,4,6-cyclohexatrione (U.S. Pat. No. 4,202,840).

Scheme 2

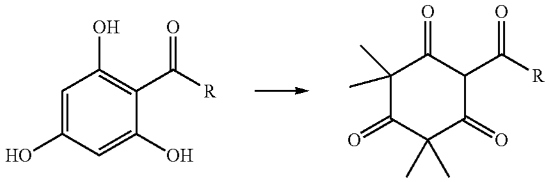

The at least one second pesticide may be obtained commercially.

The effective amount of the combination may be readily determined by a person skilled in the art and may depend on the combination, the environment in which the combination is being used and the insect species being controlled.

The effective amount of each of the compounds in the combination may be that used as known in the art. For example, the second pesticide may be used in an amount in accordance with its label. The amount of compound of formula (I) may be in the amount in the range of 0.1 to 500,000 ppm, especially 1 to 200,000 ppm or 1 to 100,000 ppm, or in amounts of 0.01 to 500 g/L.

However, in some embodiments, the amount of one, both or all of the components of the combination are present at a reduced amount than normally used, especially where the at least one second pesticide is used in a reduced amount. Advantageously the reduced amount may reduce toxicity and/or environmental impact.

In some embodiments, the amount of one, both or all of the components is reduced to such an extent that if it were used alone, it would be ineffective or not effective in achieving complete control of the insect pests. In some embodiments, one, both or all of the compounds of the combination are used in a synergistic amount thereby achieving a synergistic effect. For example, in some embodiments compound of formula (I) is used in a sub-effective amount, for example, a $LC_{10}$, $LC_{15}$, $LC_{20}$, $LC_{25}$, $LC_{30}$, $LC_{35}$, $LC_{40}$, $LC_{45}$, $LC_{50}$, $LC_{55}$, $LC_{60}$, $LC_{65}$, $LC_{70}$, $LC_{75}$, $LC_{80}$, $LC_{85}$, $LC_{90}$ or $LC_{95}$ amount and the second insecticide is used at its recommended dose. In other embodiments, the compound of formula (I) and the second insecticide are used at sub-effective amounts.

In some embodiments, the effective amount is an insecticidally or arachnicidaly effective amount that is aimed at causing mortality in the insect or arachnid population exposed to the combination. In other embodiments, the effective amount is an insect or arachnid repelling amount that is aimed at repelling insects or arachnids from a particular environment that is at risk of insect or arachnid infestation.

The compositions and method of the present invention may be applied to control insects such as:

(a) from the order of the lepidopterans (Lepidoptera), for example, *Adoxophyes orana, Agrotis ipsilon, Agrotis segetum, Alabama argillacea, Anticarsia gemmatalis, Argyresthia conjugella, Autographa gamma, Cacoecia murinana, Capua reticulana, Choristoneura fumiferana, Chilo partellus, Choristoneura occidentalis, Cirphis unipuncta, Cnaphalocrocis medinalis, Crocidolomia binotalis, Cydia pomonella, Dendrolimus pini, Diaphania nitidalis, Diatraea grandiosella, Earias insulana, Elasmopalpus lignosellus, Eupoecilia ambiguella, Feltia subterranea, Grapholitha funebrana, Grapholitha molesta, Heliocoverpa armigera, Heliocoverpa virescens, Heliocoverpa zea, Hellula*

*undalis, Hibernia defoliaria, Hypliantria cunea, Hyponomeuta malinellus, Keiferia lycopersicella, Lambdina fiscellaria, Laphygma exigua, Leucoptera scitella, Lithocolletis blancardella, Lobesia botrana, Loxostege sticticalis, Lymantria dispar, Lymantria monacha, Lyonetia clerkella, Manduca sexta, Malacosoma neustria, Mamestra brassicae, Mocis repanda, Operophthera brumata, Orgyia pseudotsugata, Ostrinia nubilalis, Pandemis heparana, Panolis flamnea, Pectinophora gossypiella, Phthorimaea operculella, Phyllocnistis citrella, Pieris brassicae, Plathypena scabra, Platynota stultana, Plutella xylostella, Prays citri, Prays oleae, Prodenia sunia, Prodenia ornithogalli, Pseudoplusia includens, Rhyacionia frustrana, Scrobipalpula absoluta, Sesamia inferens, Sparganothis pilleriana, Spodoptera frugiperda, Spodoptera littoralis, Spodoptera litura, Syllepta derogata, Synanthedon myopaeforinis, Thaumatopoea pityocampa, Tortrix viridana, Trichoplusia ni, Tryporyza incertulas* and *Zeiraphera canadensis*, also *Galleria mellonella, Sitotroga cerealella, Ephestia cautella* and *Tineola bisselliella;*

(b) from the order of the beetles (Coleoptera), for example, *Anthonomus grandis, Anthonomus pomorum, Apion vorax, Atomaria linearis, Blastophagus piniperda, Cassida nebulosa, Cerotoma trifurcata, Ceuthorhynchus assimilis, Ceuthorhynchus napi, Chaetocnema tibialis, Conoderus vespertinus, Crioceris asparagi, Cryptolestes ferrugineus. Dendroctonus rufipennis, Diabrotica longicornis, Diabrotica punctata, Diabrotica virgifera, Epilachna varivestis, Epitrix hirtipennis, Eutinobothrus brasiliensis, Hylobius abietis, Hypera brunneipennis, Hypera postica, Ips typographus, Lema bilineata, Lema melanopus, Leptinotarsa decemlineata, Limonius californicus, Lissorhoptrus oryzophilus, Melanotus communis, Meligethes aeneus, Melolontha hippocastani, Melolontha melolontha, Oulema oryzae, Otiorhynchus sulcatus, Otiorhynchus ovatus, Phaedon cochleariae, Phyllopertha horticola, Phyllophaga* sp., *Phyllotreta chrysocephala, Phyllotreta nemorum, Phyllotreta striolata, Popillia japonica, Psylliodes napi, Scolytus intricatus* and *Sitona lineatus*, also *Bruchus rufimanus, Bruchus pisorum, Bruchus lentis, Sitophilus granarius, Lasioderma serricorne, Oryzaephilus surinamensis, Rhyzopertha dominica, Sitophilus oryzae, Tribolium castaneum, Trogoderma granarium* and *Zabrotes subfasciatus;*

(c) from the order of the dipterans (Diptera), for example, *Anastrepha ludens, Ceratitis capitata, Contarinia sorghicola, Dacus cucurbitae, Dacus oleae, Dasineura brassicae, Delia coarctata, Delia radicum, Hydrellia griseola, Hyleniyia platura, Liriomyza sativae, Liriomyza trifolii, Mayetiola destructor, Orseolia oryzae, Oscinella frit, Pegomya hyoscyami, Phorbia antiqua, Phorbia brassicae, Phorbia coarctata, Rhagoletis cerasi* and *Rhagoletis pomonella*, also *Aedes aegypti, Aedes vexans, Aedes albopictus, Anopheles maculipennis, Chrysomya bezziana, Cochliomyia hominivorax, Chrysomya macellaria, Cordylobia anthropophaga, Culex pipiens, Fannia canicularis, Gasterophilus intestinalis, Glossina morsitans, Haernatobia irritans, Haplodiplosis equestris, Hypoderma lineata, Lucilia cuprina, Lucilia sericata, Musca domestica, Muscina stabulans, Oestrus ovis, Tabanus bovinus* and *Simulium damnosum;*

(d) from the order of the thrips (Thysanoptera), for example, *Frankliniella fusca, Frankliniella occidentalis, Frankliniella tritici, Haplothrips tritici, Heliothrips haemorrhoidalis, Scirtothrips citri, Thrips oryzae, Thrips palmi* and *Thrips tabaci;*

(e) from the order of the hymenopterans (Hymenoptera), for example, *Athalia rosae, Atta cephalotes, Atta sexdens, Atta texana, Hoplocampa minuta, Hoplocampa testudinea, Iridomyrmex humilis, Iridomyrmex purpureus, Monomorium pharaonis, Solenopsis geminata, Solenopsis invicta, Solenopsis richteri* and *Technomyrmex albipes;*

(f) from the order of the heteropteranis (Heteroptera), for example, *Acrosternum hilare, Blissus leucopterus, Cyrtopeltis notatus, Dysdercus cingulatus, Dysdercus intermedius, Eurygaster integriceps, Euschistus ictericus, Leptoglossus phyllopus, Lygus hesperus, Lygus lineolaris, Lygus pratensis, Mormidea pictiventris, Nezara viridula, Piesma quadrata, Solubea insularis* and *Thyanta perditor;*

(g) from the order of the homopterarts (Homoptera), for example, *Acyrthosiphon onobrychis, Acyrthosiphon pisum, Adelges laricis, Aonidiella aurantii, Aphidula nasturtii, Aphis fabae, Aphis gossypii, Aphis pomi, Aulacorthum solani, Bemisia tabaci, Brachycaudus cardui, Brevicoryne brassicae, Dalbulus maidis, Dreyfusia nordmannianae, Dreyfusia piceae, Dysaphis radicola, Empoasca fabae, Eriosorna lanigerum, Laodelphax striatella, Macrosiphum avenae, Macrosiphun euphorbiae, Macrosiphon rosae, Megoura viciae, Metopolophium dirhodum, Myzus persicae, Myzus cerasi, Nephotettix cincticeps, Nilaparvata lugens, Perkinsiella saccharicida, Phorodon humuli, Psylla mali, Psylla pyri, Psylla pyricola, Rhopalosiphum maidis, Schizaphis graminum, Sitobion avenae, Sogatella furcifera, Toxoptera citricida, Trialeurodes abutilonea, Trialeurodes vaporariorum* and *Viteus vitifolaei;*

(h) from the order of the termites (Isoptera), for example, *Kalotermes flavicollis, Coptotermes* spp, *Leucotermes flavipes, Macrotermes subhyalinus, Macrotermes darwiniensis, Mastotermes* spp. *Microtermes* spp., *Nasutitermes* spp such as *Nasutitermes walkeri, Odontotermes formosanus, Reticulitermes lucifugus* and *Termes natalensis;*

(i) from the order of the orthopterans (Orthoptera), for example, *Gryllotalpa gryllotalpa, Locusta migratoria, Melanoplus bivittatus, Melanoplus femurrubrum, Melanoplus mexicanus, Melanoplus sanguinipes, Melanoplus spretus, Nomadacris septemfasciata, Schistocerca americana, Schistocerca peregrina, Stauronotus maroccanus* and *Schistocerca gregaria*, also *Acheta domesticus, Blatta orientalis, Blattella germanica* and *Periplaneta americana;*

(j) from the order of the phthirapterans (Phthiraptera), for example, *Mallophaga*, such as *Damalina* spp., and *Anoplura* such as *Linognathus* and *Haematopinus* spp.;

(k) from the order of the hemnipterans (Hemiptera), for example, *Aphis, Bemisia, Phorodon, Aeneolamia, Empoasca, Perkinsiella, Pyrilla, Aonidiella, Coccus, Pseudococcus, Helopeltis, Lygus, Dysdercus, Oxycarenus, Nezara, Aleyrodes, Triatoma, Psylla, Myzus, Megoura, Phylloxera, Adelges, Nilaparvata, Nephotettix* or *Cimex* spp.;

(l) from the order of the siphonapterans (Siphonaptera), for example, *Ctenocephalides* or *Pulex* spp.;

(m) from the order of the thysanurans (Thysanura), for example, *Lepisina* spp.;

(n) from the order of the dermapterans (Dermaptera), for example, *Forficula* spp.; and (o) from the order of the psocopterans (Psocoptera), for example, *Peripsocus* spp.

In particular embodiments, the insect is in the order of Diptera, especially *Musca* species such as *Musca domestica, Aedes* species such as *Aedes aegypti, Aedes vexans* and *Aedes albopictus* and *Culex* species such as *Culex pipiens* and *Culex quinquefasciatus.*

The compositions and methods of the invention may be used to control arachnids, especially ticks and mites such as:

i) Mites such as *Aculops lycopersicae, Aculops pelekassi, Aculus schlechtendai, Brevipalpus phoenicis, Brevipalpus californicus, Bryobia praetiosa, Bryobia rubrioculus, Dermanyssus gallinae, Eotetranychus carpini, Eotetranichus lewisi, Eutetranychus banksia, Eutetranychus orientalis, Eriophyes sheldoni, Eryophyes tiliae, Eriophyes inangulis, Eriophyes vitis, Oligonychus pratensis, Oligonychus coffeae, Oligonitis oryzae, Oligonychus milleri, Panonychus ulmi, Panonychus citri, Phyllocoptruta oleivora, Polyphagotarsonemus latus, Psoroptes ovis, Sarcoptes scabiei, Tarsonemus pallidus, Tetranychus cinnabarinus, Tetranychus kanzawai, Tetranychus pacificus* and *Tetranychus urticae.* ii) Ticks such as *Amblyomma americanum, Amblyomma variegatum, Argas persicus, Boophilus annulatus, Boophilus decoloratus, Boophilus miccroplus, Dermacentor silvarum, Hyalomma truncatum, Ixodes ricinus, Ixodes rubicundus, Ornithodorus moubata, Otobius megnini, Rhipicephalus apendiculatus, Rhipicephalus evertsi* and *Rhipicephalus microplus.*

Formulations

In some embodiments, the compound of formula (I) and the at least one second pesticide are formulated separately for simultaneous or sequential application. In other embodiments, the compound of formula (I) and the at least one second pesticide are formulated in a single composition, optionally together with acceptable carriers, diluents and/or excipients.

In another aspect of the present invention there is provided a composition comprising a compound of formula (I) and at least one second pesticide, optionally further comprising a carrier, diluent and/or excipient.

The composition may be formulated into any suitable composition such as a spray, aerosol, oil, emulsifiable concentrate, wettable powder, flowable formulation, granulated formulation, powder, dust, solution, suspension, emulsion or controlled release formulation. The composition may be formulated with solid or liquid carriers as appropriate. The choice of formulation and mode of application will depend on the combination being used, pest being controlled and the environment it is being controlled in and appropriate selection will be made with consideration of combination, pest and environment.

In some embodiments, the formulation may contain naturally occurring additive, such as antioxidants and stabilizers. For example, antioxidants may include α-tocopherol, and suitable stabilizers may include gum arabic, guar gum, locust bean gum, xanthan gum, kelgum, polyvinyl alcohol, sodium caseinate and mixtures thereof.

Examples of solid carriers useful in preparing the formulations are clays including kaolin clay, diatomite, water-containing synthetic silicon oxide, bentonite, Fubasami clay, and acid clay; talcs; ceramics; inorganic minerals such as Celite™ quartz, sulfur, active carbon, calcium carbonate and hydrated silica; these solid carriers being finely divided or granular. Examples of useful liquid carriers are water, alcohols such as methanol and ethanol, ketones such as acetone and methyl ethyl ketone, aromatic hydrocarbons such as benzene, toluene, xylene, ethylbenzene and methylnaphthalene, aliphatic hydrocarbons such as hexane, cyclohexane, kerosene and light oil, esters such as ethyl acetate and butyl acetate, nitriles such as acetonitrile and isobutyronitrile, ethers such as diisopropyl ether and dioxane, acid amides such as N,N-dimethylformamide and N,N-dimethylacetamide, halogenated hydrocarbons such as dichloromethane, trichloroethane and carbon tetrachloride, dimethyl sulfoxide, and fish oils, mineral oils, plant derived oils such as canola oil, olive oil, cotton-seed oil, soybean oil and sesame oil as well as essential oils such as lavender oil, eucalyptus oil, tea tree oil, citrus oil etc. Solid or liquid carriers can be used alone or in combination. Examples of gas carriers, those of propellants, are butane gas, isobutene, pentane, LPG (liquefied petroleum gas), dimethyl ether, fluorocarbons and carbon dioxide gas.

Examples of surfactants are alkylsulfuric acid esters, alkylsulfonic acid salts, alkylarylsulfonic acid salts, alkyl aryl ethers and polyoxyethylene adducts thereof, polyethylene glycol ethers, polyhydric alcohol esters, sugar alcohol derivatives, sorbitane monolaurate, alkylallyl sorbitane monolaurate, alkylbenzene sulfonate, alkylnaphthalene sulfonate, lignin sulfonate, and sulfuric acid ester salts of higher alcohols. These surfactants may be used alone or in combination.

Examples of adjuvants for the formulations, such as binders and dispersants, are casein, gelatin, polysaccharides such as starch, gum arabic, cellulose derivatives and alginic acid, lignin derivatives, bentonite, sugars and water-soluble synthetic high molecular-weight substances such as polyvinyl alcohol, polyvinyl pyrrolidone and polyacrylic acids. Examples of stabilisers are PAP (acid isopropyl phosphate), BHT (2,6-di-tert-butyl-4-methylphenol), BHA (mixture of 2-tert-butyl-4-methoxyphenol and 3-tertbutyl-4-methoxyphenol), synergists such as piperonyl butoxide, vegetable oils, mineral oils, fish oils, surfactants and fatty acids or esters thereof.

Emulsifying agents that may be used are suitably one or more of those selected from non-ionic or anionic emulsifying agents. Examples of non-ionic emulsifying agents include, but are not restricted to, polyoxyethylenealkylphenylether, polyoxyethylenealkylether, polyethyleneglycol fatty ester, sorbitan fatty ester, polyoxyethylene sorbitan fatty ester, polyoxyethylenesorbitol fatty ester, polyoxyethylenepolyoxypropylenealkylether. Examples of anionic emulsifying agents include alkyl sulphates, polyoxyethylenealkylether sulphates, sulfosuccinates, taurine derivatives, sarcosine derivatives, phosphoric esters, alkylbenzenesulfonates and the like. A mixture consisting of polyoxyethylenestyrylphenylether and calcium allylbenzenesulfonate is preferred. These emulsifying agents may be used in an amount of 1 to 20 weight parts per 100 weight parts of the compositions of the present invention.

In a particular embodiment, the composition is formulated as a spray composition comprising both the compound of formula (I) and the second pesticide, particularly where the compound of formula (I) is flavesone and where the at least one second pesticide is an insecticide that comprises a pyrethroid such as permethrin, deltamethrin or cypermethrin.

The spray may be formulated as a liquid for use in an atomizer or aerosol. In some embodiments, the liquid solubilizes the compounds of formula (I) and the second pesticide, for example, where the liquid or solvent is an oil or hydrocarbon solvent. In other embodiments, the liquid is an aqueous liquid and the formulation is in suspension or emulsion form.

In some embodiments, the composition may include a propellant such as butane, isobutene, pentane, carbon dioxide or nitrogen.

The spray formulation may be used as a pesticidal, especially an insecticidal aerosol deployed into the air of an environment such as a household or industrial environment to control airborne insects such as flies and mosquitoes. Alternatively, the spray formulation may be applied to a surface upon which an insect or arachnid pest may alight, for example, window sills, floor surfaces, benches or work surfaces, shelves, steps and the like. The insect or arachnid pest being exposed to the composition when it comes into contact with the treated surface.

In a particular embodiment of the invention, there is provided a composition comprising flavesone and a pyrethroid compound together with a liquid carrier, wherein the composition is formulated as a spray composition.

In some embodiments, the spray composition is an aerosol or atomizer composition.

In a particular embodiment, there is provided a method of controlling insects in a household or industrial environment or an indoor agricultural environment comprising exposing the insects to a combination comprising flavesone and a pyrethroid compound.

In some embodiments, the combination is in a single composition. In some embodiments, the composition is a spray composition, such as an aerosol or an atomizer composition.

In some embodiments, the insect being controlled is a flying insect, such as a fly or a mosquito. In some embodiments, the composition is deployed in the air of the environment. In other embodiments, the composition is deployed on one or more surfaces in the environment.

Advantageously, the combination of flavesone and pyrethroid compound provides not only "knockdown" of the flying insects, but also improves mortality. By "knockdown", it is meant that upon contact with the composition there is rapid incapacitation of the insect preventing it from crawling or flying away. Knockdown may be permanent causing mortality or may occur for a period of time after which the insect resumes its capability to fly and crawl. Rapid knockdown may allow exposure of the insect to the mortality causing insecticide for a longer period of time, resulting in higher mortality rates.

Kits

In another aspect of the invention there is provided a kit comprising a compound of formula (I) or a tautomer thereof and at least one second pesticide.

Each of the compounds may be formulated in separate compositions for application separately. Alternatively, each of the compounds is formulated in the one composition for application together.

In some embodiments, the kit includes instructions for use. The instructions may include application rates suitable for specific insect or arachnid pests or environments, or for mixing the active compounds together.

In some embodiments, the kit may also contain dispensing apparatus such as spray bottles or apparatus.

In order that the invention may be readily understood and put into practical effect, particular preferred embodiments will now be described by way of the following non-limiting examples.

BRIEF DESCRIPTION OF THE FIGURES

FIG. 5(*c*) shows flavesone positive controls administered at $LC_{10}$ and $LC_{90}$ single dose points at 24 and 48 hours. The data represent n=3 biological replicates.

FIG. 5(*c*) shows flavesone positive controls administered at $LC_{10}$ and $LC_{90}$ single dose points at 24 and 48 hours. The data represent n=3 biological replicates.

EXAMPLES

Example 1

Figure 1A:
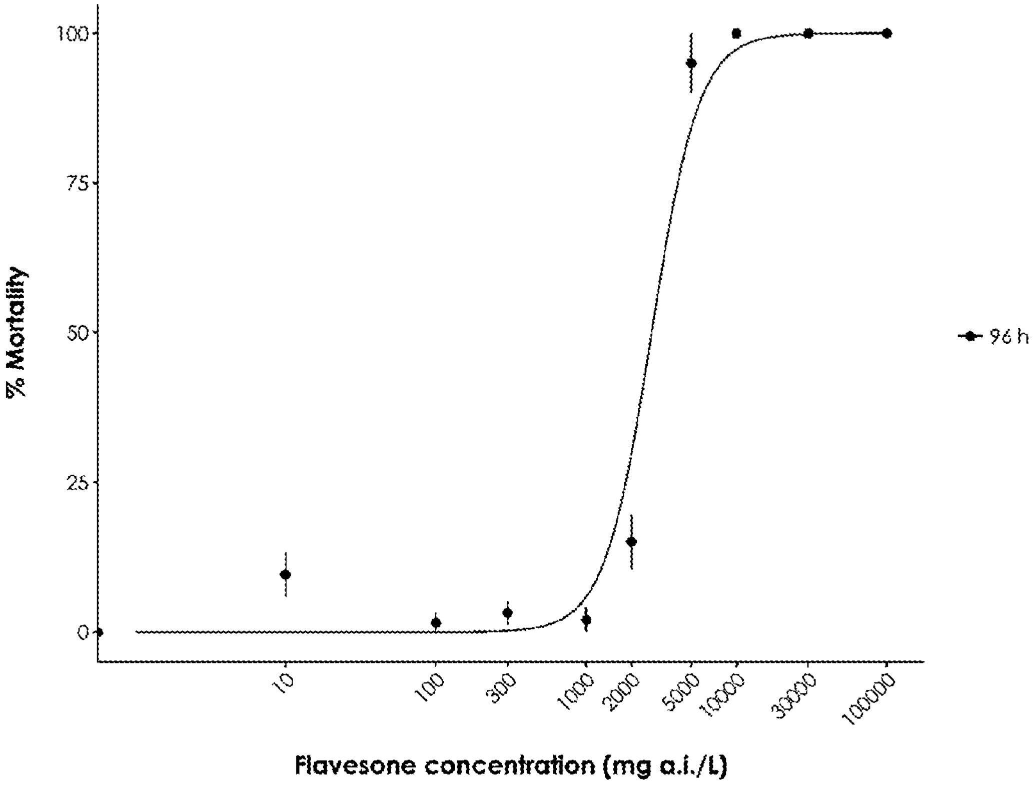
FIG. 1 provides graphical representations of chemical dose response curves for an insecticide-susceptible populations of *M. persicae* after 96 hours exposure to a) flavesone, b) pirimicarb, c) dimethoate and d) alpha-cypermethrin.
Figure 1B:
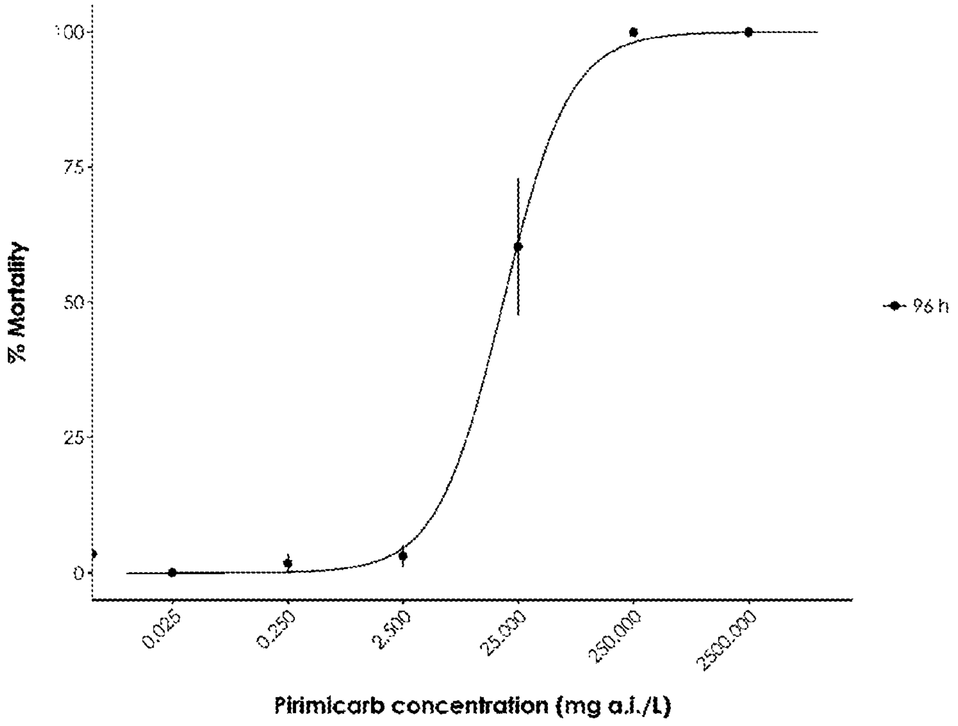
Figure 1C:
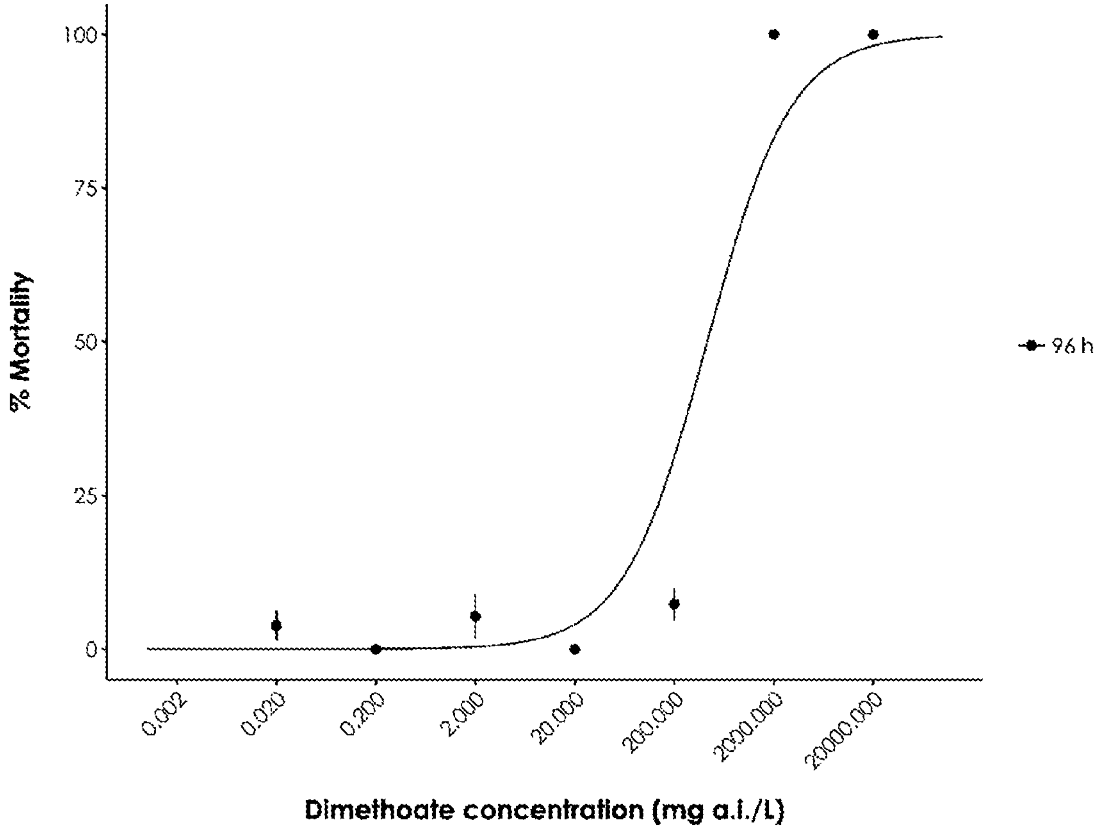
Figure 1D:
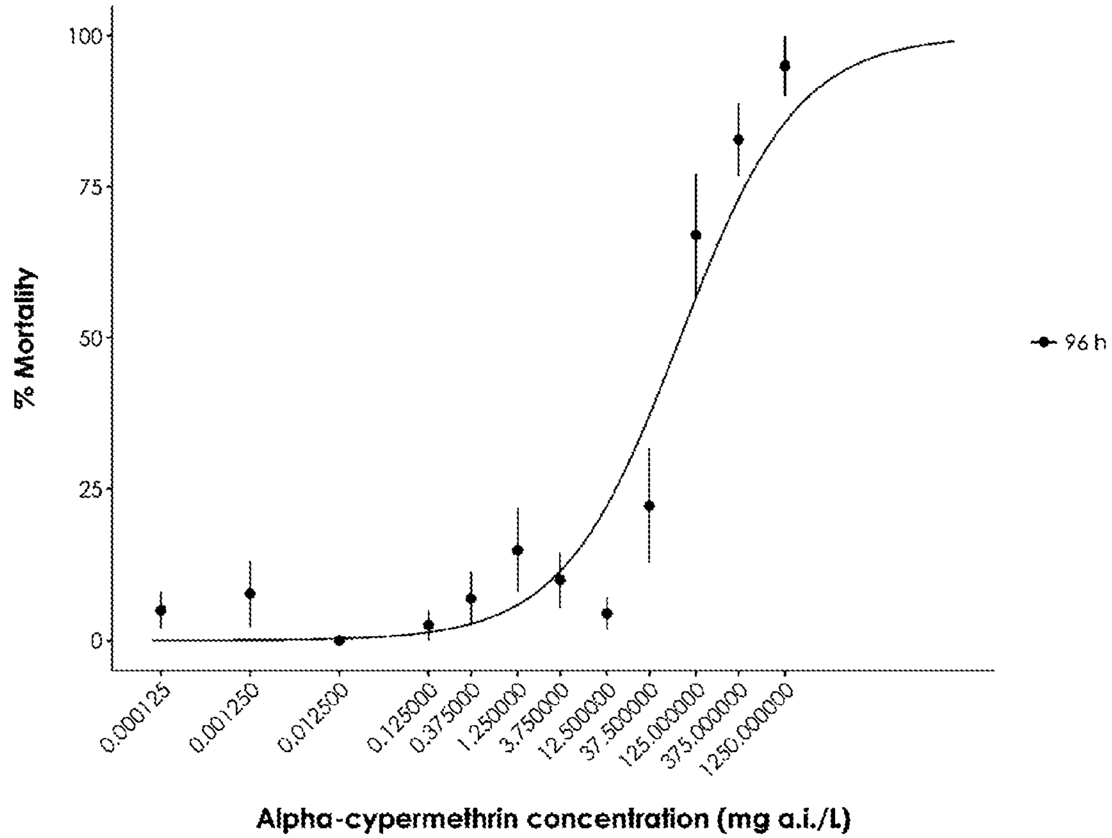

A spray composition was prepared by mixing 100 g of permethrin and 500 g of flavesone in 1 L of hydrocarbon solvent. The formulation was placed in a pump-spray container for application.

Example 2

| | | |
|---|---|---|
| 1. | Flavesone in hydrocarbon liquid | 200 mg/mL |
| 2. | Flavesone in hydrocarbon liquid | 100 mg/mL |
| 3. | Permethrin in hydrocarbon liquid | 2.5 mg/mL |
| 4. | Permethrin in hydrocarbon liquid | 1.25 mg/mL |
| 5. | Combination 1 in hydrocarbon liquid | |
| | Flavesone | 200 mg/mL |
| | Permethrin | 2.5 mg/mL |
| 6. | Combination 2 in hydrocarbon liquid | |
| | Flavesone | 200 mg/mL |
| | Permethrin | 1.25 mg/mL |
| 7. | Combination 3 in hydrocarbon liquid | |
| | Flavesone | 100 mg/mL |
| | Permethrin | 2.5 mg/mL |
| 8. | Combination 4 in hydrocarbon liquid | |
| | Flavesone | 100 mg/mL |
| | Permethrin | 1.25 mg/mL |

Each formulation was filled into a hand-held pump sprayer. The treatments were applied to tiles from a distance of 20 cm. The tile was placed on a 0.5 $m^2$ grid and the entire 0.5 $m^2$ was sprayed, including the tile, at a rate of 50 mL/$m^2$. To ensure the correct volume was applied, the pump sprayer was weighed before and after spraying.

The tiles were left for two hours post-treatment to allow the formulation to dry on the tile, before evaluation started.

A control tile that was not treated with any formulation (untreated) was also used.

Ten mixed sex *Musca domestica* houseflies were placed in a plastic petri dish using a powered aspirator. The petri dish placed over a treated or control tile surface. The petri dish was perforated for ventilation with small holes and a cotton wool plug soaked in sugar solution provided moisture and plugged the insect introduction hole in the petri dish.

The houseflies were constantly exposed to a treated or untreated tile surface. The exposure took place at a temperature of 22±2° C. and about 50% relative humidity (RH).

After 30 minutes exposure, a piece of paper was placed over the tile surface to prevent contact of the houseflies with the treated or untreated tile. The houseflies were held at 22±2° C. and about 50% RH for 24 hours.

Housefly knockdown was noted 15 minutes and 30 minutes after beginning of exposure and 1, 2, 3 and 4 hours after initial exposure. Mortality was noted at 24 hours after initial exposure.

The above experiment was repeated four times to give five replicates. No statistical analysis was done. The results are shown in Table 1:

TABLE 1

The Mortality of *Musca domestica* at Various Exposure Times

| Treatment & Concentration (mg/ml) | Replicate | The Knockdown & Mortality of Insects at Various Exposure Times (n = 10) 15 mins KD | 30 mins KD | 1 hr KD | 2 hrs KD | 3 hrs KD | 4 hrs KD | 24 hrs Mortality |
|---|---|---|---|---|---|---|---|---|
| Flavocide | 1 | 10 | 10 | 10 | 10 | 10 | 10 | 10 |
| 200 mg/ml | 2 | 10 | 10 | 10 | 10 | 10 | 10 | 10 |
| | 3 | 10 | 10 | 10 | 10 | 10 | 10 | 10 |
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Flavocide | 1 | 10 | 10 | 10 | 10 | 10 | 10 | 10 |
| 100 mg/ml | 2 | 10 | 10 | 10 | 10 | 10 | 10 | 10 |
| | 3 | 10 | 10 | 10 | 10 | 10 | 10 | 10 |

TABLE 1-continued

The Mortality of *Musca domestica* at Various Exposure Times

| Treatment & Concentration (mg/ml) | Replicate | The Knockdown & Mortality of Insects at Various Exposure Times (n = 10) 15 mins KD | 30 mins KD | 1 hr KD | 2 hrs KD | 3 hrs KD | 4 hrs KD | 24 hrs Mortality |
|---|---|---|---|---|---|---|---|---|
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Permethrin 2.5 mg/ml | 1 | 5 | 9 | 9 | 9 | 8 | 8 | 7 |
| | 2 | 5 | 9 | 9 | 8 | 7 | 7 | 5 |
| | 3 | 7 | 10 | 10 | 10 | 10 | 10 | 7 |
| | 4 | 9 | 9 | 10 | 10 | 10 | 10 | 9 |
| | 5 | 9 | 9 | 9 | 9 | 9 | 8 | 8 |
| | TOTAL | 35 | 46 | 47 | 46 | 44 | 43 | 36 |
| Permethrin 1.25 mg/ml | 1 | 5 | 9 | 10 | 9 | 9 | 8 | 4 |
| | 2 | 4 | 8 | 9 | 7 | 5 | 5 | 5 |
| | 3 | 6 | 10 | 10 | 10 | 10 | 9 | 9 |
| | 4 | 9 | 10 | 10 | 9 | 9 | 7 | 7 |
| | 5 | 8 | 9 | 8 | 8 | 7 | 7 | 6 |
| | TOTAL | 32 | 46 | 47 | 43 | 40 | 36 | 31 |
| Flavocide 200 mg/ml + Permethrin 2.5 mg/ml | 1 | 10 | 10 | 10 | 10 | 10 | 10 | 10 |
| | 2 | 10 | 10 | 10 | 10 | 10 | 10 | 10 |
| | 3 | 10 | 10 | 10 | 10 | 10 | 10 | 10 |
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Flavocide 200 mg/ml + Permethrin 1.25 mg/ml | 1 | 10 | 10 | 10 | 10 | 10 | 10 | 10 |
| | 2 | 10 | 10 | 10 | 10 | 10 | 10 | 10 |
| | 3 | 10 | 10 | 10 | 10 | 10 | 10 | 10 |
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Flavocide 100 mg/ml + Permethrin 2.5 mg/ml | 1 | 10 | 10 | 10 | 10 | 10 | 10 | 10 |
| | 2 | 10 | 10 | 10 | 10 | 10 | 10 | 10 |
| | 3 | 10 | 10 | 10 | 10 | 10 | 10 | 10 |
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Flavocide 100 mg/ml + Permethrin 1.25 mg/ml | 1 | 10 | 10 | 10 | 10 | 10 | 10 | 10 |
| | 2 | 10 | 10 | 10 | 10 | 10 | 10 | 10 |
| | 3 | 10 | 10 | 10 | 10 | 10 | 10 | 10 |
| | 4 | 10 | 10 | 10 | 10 | 10 | 10 | 10 |
| | 5 | 10 | 10 | 10 | 10 | 10 | 10 | 10 |
| | TOTAL | 50 | 50 | 50 | 50 | 50 | 50 | 50 |
| Control | 1 | 0 | 0 | 0 | 0 | 0 | 0 | 1 |
| | 2 | 0 | 0 | 0 | 0 | 0 | 0 | 0 |
| | 3 | 0 | 0 | 0 | 0 | 0 | 0 | 1 |
| | 4 | 0 | 0 | 0 | 0 | 0 | 0 | 0 |
| | 5 | 0 | 0 | 0 | 0 | 0 | 0 | 0 |
| | TOTAL | 0 | 0 | 0 | 0 | 0 | 0 | 2 |

Formulated Flavesone Alone

At the rates of 200 mg/mL & 100 mg/mL, formulated flavesone alone achieved 100% knockdown of Houseflies after 15 minutes exposure. Mortality at 24 hours post initial exposure was 100% for both formulated flavesone rates.

Permethrin Alone

At the label rate of 2.5 mg/mL and 50% of the label rate of 1.25 mg/mL, permethrin alone did not achieve 100% knockdown of houseflies at any assessment time. Both rates achieved 94% at 1-hour post initial exposure, however there was some recovery. At 24 hours post-initial exposure, mortality was 72% for houseflies exposed to permethrin at the 2.5 mg/mL rate and 62% for houseflies exposed to the 1.25 mg/mL rate.

Flavesone & Permethrin Combinations

All 4 combinations of formulated flavesone and permethrin achieved 100% knockdown after 15 minutes exposure. Mortality was 100% at 24 hours post-initial exposure.

Control

Control mortality was 4% at 24 hours post-initial exposure.

Example 2: Effects of Flavesone on Dorsal Root Ganglion Electrophysiological Activity Dorsal root ganglion (DRG) cells were obtained from young adult male Sprague-Dawley rats weighing 220-250 g. The rats were housed in groups of 4 in an air conditioned room on a 12 hour light/dark cycle with food and water available ad libitum.

Cell Isolation

Animals were humanely killed and the lower thoracic and upper lumbar region DRG removed and stored in chilled phosphate buffered saline (PBS). The DRG were carefully trimmed and then digested using 2 mg/mL trypsin (type XII-S) and 2 mg/mL collagenase (type XI), freshly made up in PBS, for 45-60 mins in a shaking water bath at 37° C. Subsequent to extensive washing with PBS and then plating medium (PM; 50:50 mix of DMEM/Hams F12, supplemented with 10% foetal bovine serum, 100 U/mL penicillin and 100 μg/mL streptomycin), careful trituration of the DRG was carried out using sterile fire polished glass pipettes of decreasing diameter and the cells were plated on coated glass coverslips (BD Biosciences, BD Biocoat, poly-D-Lysine), contained in 35 mm tissue culture dishes so that the cells could be easily transferred to the recording chamber mounted on an Olympus IX51 upright microscope for electrophysiological recording. Cells were incubated under standard tissue culture conditions (36° C. in a humidified atmosphere of 5% $CO_2$, 95% air) and were used within 48-72 hours of plating.

Electrophysiological Recording

Whole-cell patch-clamp recordings were conducted at room temperature (−21° C.) using an Axopatch 200B amplifier (Axon Instruments Inc., USA) with 3-7 MΩ electrodes, depending on the patch success rate and recording quality. Data were filtered and digitized appropriately. Current-clamp recordings were performed with pipette solution of the following composition: 140 mM KCl, 0.5 mM EGTA, 5 mM HEPES, 3 mM Mg-ATP and 3 mM Na-GTP (pH 7.3), adjusted to 310 mOsm/L with glucose. The bathing solution contained: 140 mM NaCl, 3 mM KCl, 2 mM $MgCl_2$, 2 mM $CaCl_2$, and 10 mM HEPES (pH 7.3), adjusted to 315 mOsm/L with glucose. Passive membrane properties (e.g. resting membrane potential (Vm)) were monitored during the first few minutes from establishing whole-cell access and periodically during recording. Evoked potential recordings commenced 3-5 minutes after establishing whole-cell configuration.

Flavesone test solutions were prepared fresh from a stock solution (96.7% w/w) on the day of recording. 100 μL of flavesone composition was mixed with 100 L of Tween 80 and diluted to 10 mL in artificial cerebrospinal fluid (aCSF) to give a final flavesone concentration of 1%. The pH of the 1% solution was adjusted to 7.3 with 1M NaOH and diluted to 0.5% and 0.25% flavesone concentration with aCSF containing 1% Tween 80 immediately prior to use. Test compounds were applied using a DAD-16VC fast perfusion system (ALA Scientific Instruments, USA) and compared to the results gathered using control flow. The control was aSCF with 1% Tween 80.

Comparison samples of permethrin were prepared as 100 μM permethrin in dimethoxysulfide (DMSO).

Analysis

All analysis was conducted using Clampfit (MDS Analytical Technologies) and Excel (Microsoft) software. Statistical comparisons between groups were performed using the Student's t-test with P<0.05 taken to identify a significant difference.

The effects of different concentrations of flavesone on membrane potential is shown in Table 2.

TABLE 2

| | Vm (mV) | | Δ Vm (mV) | | | P vs Tween Paired T- |
|---|---|---|---|---|---|---|
| | Mean | SEM | Mean | SEM | n | Test |
| Control | −64.47 | 2.12 | | | 7 | |
| Tween 80 | −55.32 | 2.24 | 1.16 | 0.47 | 7 | |
| 0.25% flavesone | −71.51 | 2.22 | −7.80 | 1.56 | 6 | 0.00467 |
| 0.5% flavesone | −73.54 | 1.94 | −18.15 | 1.39 | 7 | 0.00001 |
| 1% flavesone | −83.75 | 2.89 | −29.82 | 2.98 | 7 | 0.00012 |
| Wash | −54.50 | 2.13 | −0.60 | 0.97 | 6 | |

The effects of 100 μM permethrin in the same experiment are shown in Table 3, compared to 0.5% flavesone.

TABLE 3

| | Vm (mV) | | Δ Vm (mV) | | | |
|---|---|---|---|---|---|---|
| | Mean | SEM | Mean | SEM | n | P |
| Control | −61.62 | 2.71 | | | 5 | |
| 0.1% DMSO | −60.52 | 2.02 | 1.10 | 0.99 | 5 | |
| 100 μM permethrin | −61.48 | 1.88 | −08 | 0.29 | 5 | 0.1346 |
| 0.5% flavesone | −80.56 | 5.28 | −19.63 | 3.37 | 4 | 0.0003 |
| Wash | −61.60 | 2.24 | −0.92 | 1.04 | 5 | 0.3462 |

Flavesone reduced the mean resting potential (Vm) in the cells from about −62 mV to about −84 mV. This result indicates that flavesone activates one or more potassium channels.

In contrast, permethrin (100 μM) has no effect on mean resting potential (Vm).

The effects of flavesone and permethrin on action potential firing properties of the DRG were examined. The results are shown in Tables 4 to 9.

TABLE 4

| | Normalised No. of Action Potentials @ Vh −50 mV | | | | |
|---|---|---|---|---|---|
| | Control | Tween 80 | 0.5% flavesone | 1% flavesone | Wash |
| Mean | 100 | 96.7 | 74.0 | 65.8 | 77.5 |
| n | 6 | 6 | 5 | 4 | 6 |
| SEM | 0 | 3.3 | 6.0 | 10.0 | 6.6 |
| P | | ns | P < 0.01 | P < 0.01 | |

TABLE 5

| | Normalised Action Potentials Amplitude | | | | |
|---|---|---|---|---|---|
| | Control | Tween 80 | 0.5% flavesone | 1% flavesone | Wash |
| Mean | 100 | 96.54 | 77.72 | 28.35 | 91.69 |
| n | 6 | 6 | 5 | 4 | 6 |
| SEM | | 2.23 | 6.21 | 5.49 | 2.97 |
| P | | ns | P < 0.05 | P < 0.01 | |

TABLE 6

| | Normalised Action Potentials Amplitude | | | | |
|---|---|---|---|---|---|
| | Control | Tween 80 | 0.5% flavesone | 1% flavesone | Wash |
| Mean | 100 | 93.68 | 90.17 | 91.50 | 96.26 |
| n | 6 | 6 | 5 | 4 | 6 |

TABLE 6-continued

| | Normalised Action Potentials Amplitude | | | | |
|---|---|---|---|---|---|
| | Control | Tween 80 | 0.5% flavesone | 1% flavesone | Wash |
| SEM | | 3.58 | 4.41 | 3.99 | 3.87 |
| P | | ns | ns | ns | |

Flavesone slightly reduced the number of action potentials (Table 4) and reduced the amplitude of the action potentials (Table 5). However, flavesone had no significant effect on the action potential threshold (Table 6).

TABLE 7

| | DRG Normalised No. of Action Potentials @ Vh −50 mV | | | |
|---|---|---|---|---|
| | Control | 0.1% DMSO | 100 μM permethrin | Wash |
| Mean | 100 | 95.00 | 17.95 | 99.55 |
| n | 4 | 4 | 4 | 4 |
| SEM | 0 | 5.00 | 2.84 | 5.47 |
| P | | ns | P < 0.01 | |

TABLE 8

| | Normalised Action Potentials Amplitude | | | |
|---|---|---|---|---|
| | Control | 0.1% DMSO | 100 μM permethrin | Wash |
| Mean | 100 | 99.93 | 99.46 | 97.53 |
| n | 4 | 4 | 4 | 4 |
| SEM | | 0.75 | 0.70 | 1.58 |
| P | | ns | ns | |

TABLE 9

| | Normalised Action Potentials Amplitude | | | |
|---|---|---|---|---|
| | Control | 0.1% DMSO | 100 μM permethrin | Wash |
| Mean | 100 | 101.00 | 100.20 | 100.51 |
| n | 4 | 4 | 4 | 4 |
| SEM | | 2.03 | 0.81 | 0.84 |
| P | | ns | ns | |

In contrast, permethrin (100 μM) significantly reduced the number of action potentials (Table 7) but had no effect on the amplitude of the actions (Table 8) or the action potential threshold (Table 9).

Pyrethroids such as permethrin are known to be sodium channel modulators. Analysis of the effects of flavesone and permethrin on sodium conductance in the DRG was examined. The results are shown in Tables 10 to 12.

Flavesone had no significant effect on sodium conductance amplitude (Table 10) and there was no significant difference in the area under the curve (AUC) for the control, 0.5% flavesone, 1% flavesone and the wash with Tween 80.

Although permethrin also had little effect on sodium conductance amplitude (Table 11), there was a significant increase in the are under the curve (AUC) (Table 12).

TABLE 10

| | Normalised $Na^+$ Conductance Amplitude | | | |
|---|---|---|---|---|
| | Control | 0.5% flavesone | 1% flavesone | Wash |
| Mean | 100 | 84.65 | 77.56 | 96.24 |
| n | 4 | 4 | 4 | 4 |
| SEM | 0 | 1.78 | 2.75 | 2.37 |
| P | | ns | ns | |

TABLE 11

| | Normalised $Na^+$ Conductance Amplitude | | |
|---|---|---|---|
| | Control | 100 μM permethrin | Wash |
| Mean | 100 | 103.47 | 103.80 |
| n | 3 | 3 | 3 |
| SEM | | 2.95 | 3.75 |
| P | | ns | |

TABLE 12

| | Normalised $Na^+$ Conductance Amplitude | | |
|---|---|---|---|
| | Control | 100 μM permethrin | Wash |
| Mean | 100 | 282.56 | 119.01 |
| n | 3 | 3 | 3 |
| SEM | | 51.90 | 13.57 |
| P | | P < 0.05 | |

In summary, flavesone induced pronounced membrane hyperpolarization in DRG neurones which rapidly recovered in washout. Permethrin had no effect on DRG neuron membrane potential. Flavesone also reduced input resistance in DRG neurones indicative of the opening of ion channels with in the membrane. The resting potential from current-voltage relations is about −84 mV indicated activation of one or more potassium channels in the present of flavesone. In contrast, permethrin had no effect on the input resistance of DRG neurones.

Flavesone reduces the number and amplitude of action potentials in DRG neurones, although both of these effects may be in direct due to membrane "shunt" induced by potassium conductance activation rather than a direct effect on the action potential itself. Permethrin likewise significantly reduced the number of action potentials in DRG neurones but had no effect of their mean amplitude. The reduction in action potential number reflects slowed channel inactivation and deactivation leading to prolonged channel open time. The threshold for action potential firing is largely unaffected by flavesone or permethrin. When assessed in the voltage clamp recording configuration, flavesone reduced sodium channel conductance by approximately 20% although this was not significantly different to control and had no effect of channel inactivation/deactivation. Permethrin had little effect on peak sodium channel conductance but significantly prolonged channel inactivation.

These results show that flavesone activated potassium channels and had no effect on sodium channels whereas permethrin, a known sodium channel modulator had an effect on sodium channels but no effect on potassium channels.

Example 3: Evaluation of Combination of Flavesone and Chlopyrifos-Methyl (Reldan) Against Major Stored Grain Pests Having Resistance to Commonly Used Pesticides Laboratory established strains (both susceptible and resistant) of five species were considered for this experiment. The resistant strains listed below represent the grain protectant-resistant genotypes that are commonly encountered in grain storages in Australia, particularly in the eastern grain belt:

*Rhyzopertha dominica* strain QRD1440 is resistant to OP protectants and pyrethroids.

*Tribolium castaneum* strain QTC279 is resistant to malathion and bioresmethrin

*Cryptolestes ferrugineus* strain QCF73 is resistant to phosphine

*Oryzaephilus surinamensis* strain QOS302 is resistant to fenitrothion & chlorpyrifos-methyl

*Sitophilus oryzae* strain QSO393 is resistant to fenitrothion

Testing Program

Grain Treatment and Bioassays

Residue and insect-free organically produced wheat was used in this study. Moisture content of the wheat before treatment was kept at 11%. Chemicals for use in these experiments: flavesone and Reldan (500 g/L Chlorpyrifos-methyl) were obtained from Bio-Gene Technology and Dow AgroSciences respectively. Two rates (25 and 60 ppm) were considered for the stand alone flavesone experiments.

For each strain of the borers (internal feeders), *R. dominica* and *S. oryzae*, three lots of 160 g of wheat was weighed into glass jars (500 mL capacity), i.e. one jar per treatment and another for the control (distilled water only). The solutions of each treatment (prepared at the predetermined dilution rates as alone and in combinations) were pipetted separately onto the inside of glass jars immediately above the grain surface at the rate equivalent to 10 mL of solution per kilogram of wheat. Distilled water was applied to control grain at the same rate as the treatment. All jars were sealed, briefly shaken and tumbled by hand, and then tumbled mechanically for 1 hour. Moisture content after treatment was 12%, reflecting the upper limit accepted by Australian bulk handling companies. One day after treatment, each 240 g lot of wheat was divided into three replicates of 80 g, which were placed into separate glass jars (250 mL capacity). The procedure for *T. castaneum, C. ferrugineus* and *O. surinamensis* was kept the same except that three lots of 600 g of wheat was treated per strain. One day after treatment each 600 g lot of wheat was divided into three replicates of 190 g which was then placed into glass jars (500 mL capacity). The remaining 30 g of wheat was grounded to flour, divided into three lots of 10 g and added to the relevant replicates of whole wheat so that each replicate weighed a total of 200 g. The aim of grinding 5% of each replicate to flour was to improve the reproduction of these three pest species, which are external feeders. The above activity was repeated twice over the following two days for making a total of three replicates for each treatment.

Bioassays were initiated by adding 50 adults (1-3 weeks post-emergence) to each jar of treated or control wheat. Each jar was covered with a filter paper lid and stored in a constant environment room at 25° C. and 55% r.h. for 2 weeks, after which the adults were sieved from the wheat and mortality recorded. Thereafter, all adults (dead and alive) were discarded and the jars of wheat were incubated for a further 6 weeks when the number of adult progeny were recorded. To synchronise progeny emergence, jars containing *S. oryzae* and *O. surinamensis* were incubated at 25° C. and 55% r.h., and jars containing the other species were incubated at 30° C. and 55% r.h.

Data Analysis

Each data set is presented in simple tables with percentage adult mortality and number of live adult F1 progeny (mean±standard error of 3 replicates) of each species as well the percentage progeny reduction calculated from the mean numbers of F1 progeny in the treated wheat and untreated control.

Across all the combined treatment experiments, control mortality in both susceptible and resistant strains of all 5 species was negligible (0-3%) (Tables 13-17). The number of adult progeny produced in *R. dominica* controls were 186 for the susceptible (QRD14) and resistant (QRD1440) strains (Table 13), 59 (QTC4) and 480 (QTC279) for *T. castaneum* (Table 14), 467 (QCF31) and 188 (QCF73) for *C. ferrugineus* (Table 15), 526 (VOS48) and 429 (QOS302) for *O. surinamensis* (Table 16) and 720 (LS2) and 565 (QSO393) for the susceptible and resistant strains, respectively, of *S. oryzae* (Table 17).

All experimental combinations of flavesone and chlorpyrifos-methyl applied both at the higher and lower rates were highly successful against the susceptible strains of all 5 test species, with 100% adult mortality and progeny reduction (Tables 13-17). The effectiveness of all these combinations was greatest against the resistant strain of *C. ferrugineus*, where complete control of adults and progeny were achieved (Table 16). Moreover, with the exceptions of 99% progeny reduction in a couple of combinations, all these treatments achieved 100% control of progeny in resistant strains of *T. castaneum* (QTC279), *O. surinamensis* (QOS302) and *S. oryzae* (QSO393) (Tables 14, 16 and 17). Against the resistant strain of *R. dominica* (QRD1440), however, complete adult mortality was achieved only at the combination of flavesone 60+chlorpyrifos-methyl 5 and complete progeny reduction was achieved in grain treated with the combinations of flavesone 30+chlorpyrifos-methyl 10, flavesone 60+chlorpyrifos-methyl 5, flavesone 60+chlorpyrifos-methyl 10 (Table 13).

TABLE 13

Effectiveness of Flavesone in combination of Chlorpyrifos-methyl (OP) against adults and progeny of *Rhyzopertha dominica* in treated wheat.

| Strain | Treatment (mg/kg) | Adult mortality (%)* | Live adult progeny* | Progeny reduction (%) |
|---|---|---|---|---|
| QRD14 | Control | 0.0 ± 0.0 | 186.7 ± 62.7 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QRD1440 | Control | 0.7 ± 0.7 | 186.7 ± 62.7 | — |
| | Flavesone 30 + chlorpyrifos-methyl 5 | 81.3 ± 7.7 | 4.3 ± 3.0 | 97.7 |

TABLE 13-continued

Effectiveness of Flavesone in combination of Chlorpyrifos-methyl (OP) against adults and progeny of *Rhyzopertha dominica* in treated wheat.

| Strain | Treatment (mg/kg) | Adult mortality (%)* | Live adult progeny* | Progeny reduction (%) |
|---|---|---|---|---|
| | Flavesone 30 + chlorpyrifos-methyl 10 | 96.0 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 99.3 ± 0.7 | 0.0 ± 0.0 | 100 |

*Mean ± standard error

TABLE 14

Effectiveness of Flavesone in combination of Chlorpyrifos-methyl (OP) against adults and progeny of *Tribolium castaneum* in treated wheat.

| Strain | Treatment (mg/kg) | Adult mortality (%)* | Live adult progeny* | Progeny reduction (%) |
|---|---|---|---|---|
| QTC4 | Control | 2.0 ± 0.0 | 59.3 ± 26.1 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QTC279 | Control | 0.0 ± 0.0 | 480.7 ± 25.6 | — |
| | Flavesone 30 + chlorpyrifos-methyl 5 | 99.3 ± 0.7 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |

*Mean ± standard error

TABLE 15

Effectiveness of Flavesone in combination of Chlorpyrifos-methyl (OP) against adults and progeny of *Cryptolestes ferrugineus* in treated wheat.

| Strain | Treatment (mg/kg) | Adult mortality (%)* | Live adult progeny* | Progeny reduction (%) |
|---|---|---|---|---|
| QCF31 | Control | 2.7 ± 1.8 | 467.0 ± 21.2 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |

TABLE 15-continued

Effectiveness of Flavesone in combination of Chlorpyrifos-methyl (OP) against adults and progeny of *Cryptolestes ferrugineus* in treated wheat.

| Strain | Treatment (mg/kg) | Adult mortality (%)* | Live adult progeny* | Progeny reduction (%) |
|---|---|---|---|---|
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QCF73 | Control | 2.7 ± 0.7 | 188.7 ± 30.9 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |

*Mean ± standard error

TABLE 16

Effectiveness of Flavesone in combination of Chlorpyrifos-methyl (OP) against adults and progeny of *Oryzaephilus surinamensis* in treated wheat.

| Strain | Treatment (mg/kg) | Adult mortality (%)* | Live adult progeny* | Progeny reduction (%) |
|---|---|---|---|---|
| QVOS48 | Control | 1.3 ± 0.7 | 526.3 ± 24.4 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QOS302 | Control | 0.7 ± 0.7 | 429.0 ± 28.2 | — |
| | Flavesone 30 + chlorpyrifos-methyl 5 | 4.0 ± 2.0 | 164.0 ± 41.0 | 61.8 |
| | Flavesone 30 + chlorpyrifos-methyl 10 | 8.7 ± 4.1 | 116.3 ± 37.2 | 72.9 |
| | Flavesone 60 + chlorpyrifos-methyl 5 | 27.3 ± 3.7 | 0.7 ± 1.6 | 99.8 |
| | Flavesone 60 + chlorpyrifos-methyl 10 | 30.7 ± 1.8 | 0.0 ± 0.0 | 100 |

*Mean ± standard error

TABLE 17

Effectiveness of Flavesone in combination of Chlorpyrifos-methyl (OP) against adults and progeny of *Sitophilus oryzae* in treated wheat.

| Strain | Treatment (mg/kg) | Adult mortality (%)* | Live adult progeny* | Progeny reduction (%) |
|---|---|---|---|---|
| LS2 | Control | 2.7 ± 2.7 | 720.3 ± 112.3 | — |
| | Flavesone 30 + chlorpyrifos-methyl 5 | 100 ± 0.0 | 100 ± 0.0 | 100 |

TABLE 17-continued

Effectiveness of Flavesone in combination of Chlorpyrifos-methyl (OP) against adults and progeny of *Sitophilus oryzae* in treated wheat.

| Strain | Treatment (mg/kg) | Adult mortality (%)* | Live adult progeny* | Progeny reduction (%) |
|---|---|---|---|---|
| | Flavesone 30 + chlorpyrifos-methyl 10 | 100 ± 0.0 | 100 ± 0.0 | 100 |
| | Flavesone 60 + chlorpyrifos-methyl 5 | 100 ± 0.0 | 100 ± 0.0 | 100 |
| | Flavesone 60 + chlorpyrifos-methyl 10 | 100 ± 0.0 | 100 ± 0.0 | 100 |
| QSO393 | Control | 0.0 ± 0.0 | 565.7 ± 35.0 | — |
| | Flavesone 30 + chlorpyrifos-methyl 5 | 100 ± 0.0 | 0.3 ± 0.3 | 99.9 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.7 ± 1.3 | 99.9 |
| | Flavesone 60 + chlorpyrifos-methyl 10 | 100 ± 0.0 | 0.0 ± 0.0 | 100 |

*Mean ± standard error

Table 18 provides an overview of the effectiveness of the combination of chlorpyrifos-methyl and flavesone.

TABLE 18

Overview of effectiveness of Flavesone in combination with Chlorpyrifos-methyl (CM) at different rates against five major stored grain pests.

| | | 30 ppm flavesone plus | | | | 60 ppm flavesone plus | | | |
|---|---|---|---|---|---|---|---|---|---|
| Pest | | 5 ppm CM | | 10 ppm CM | | 5 ppm CM | | 10 ppm CM | |
| species | Strain | Adults | F1 | Adults | F1 | Adults | F1 | Adults | F1 |
| *R.* | Susceptible | ✓* | ✓ | ✓ | ✓ | ✓ | ✓ | ✓ | ✓ |
| *dominica* | Resistant | X | X | X | ✓ | ✓ | ✓ | 99.3✓ | ✓ |
| *T.* | Susceptible | ✓ | ✓ | ✓ | ✓ | ✓ | ✓ | ✓ | ✓ |
| *castaneum* | Resistant | 99.3✓ | ✓ | ✓ | ✓ | ✓ | ✓ | ✓ | ✓ |
| *C.* | Susceptible | ✓ | ✓ | ✓ | ✓ | ✓ | ✓ | ✓ | ✓ |
| *ferrngineus* | Resistant | ✓ | ✓ | ✓ | ✓ | ✓ | ✓ | ✓ | ✓ |
| *O.* | Susceptible | ✓ | ✓ | ✓ | ✓ | ✓ | ✓ | ✓ | ✓ |
| *surinamensis* | Resistant | X | X | X | X | X | 99.8✓ | X | ✓ |
| *S.* | Susceptible | ✓ | ✓ | ✓ | ✓ | ✓ | ✓ | ✓ | ✓ |
| *oryzae* | Resistant | ✓ | 99.9✓ | ✓ | ✓ | ✓ | 99.9✓ | ✓ | ✓ |

Example 4: Evaluation of the Combination of Flavesone and Deltamethrin (K-Obiol) Against *R. dominica* Susceptible and Resistant Strains The Experiment of Example 3 was repeated using a combination of flavesone and deltamethrin with *R. dominica* susceptible QRD14 and resistant QRD1440 strains.

In these experiments, the control mortality remained below 1% in both the susceptible and resistant strains of this species and similar number of live adult progeny (126 and 125) were emerged (Table 19). In all combinations, complete control of both adults and progeny was achieved against the susceptible strain (QRD14), and a high level of control was achieved against the resistant strain (QRD1440) (Table 19). Against adults of the resistant strain, all combinations yielded percentage mortality of 93-100%. Similarly, all combinations yielded 99-100% reduction of progeny of the resistant strain QRD1440 (Table 19).

The results are shown in Table 19.

TABLE 19

Effectiveness of Flavesone in combination of Deltamethrin against adults and progeny of *Rhyzopertha dominica* in treated wheat.

| Strain | Treatment (mg/kg) | Adult mortality (%)* | Live adult progeny* | Progeny reduction (%) |
|---|---|---|---|---|
| QRD14 | Control | 0.7 ± 0.7 | 126.3 ± 29.9 | — |
| | Flavesone 30 + deltamethrin 0.5 | 100 ± 0.0 | 0.0 ± 0.0 | 100 |
| | Flavesone 30 + deltamethrin 1 | 100 ± 0.0 | 0.0 ± 0.0 | 100 |
| | Flavesone 60 + deltamethrin 0.5 | 100 ± 0.0 | 0.0 ± 0.0 | 100 |
| | Flavesone 60 + deltamethrin 1 | 100 ± 0.0 | 0.0 ± 0.0 | 100 |
| QRD1440 | Control | 0.7 ± 0.7 | 125.0 ± 47.7 | — |
| | Flavesone 30 + deltamethrin 0.5 | 93.3 ± 3.5 | 1.0 ± 1.0 | 99.2 |
| | Flavesone 30 + deltamethrin 1 | 97.3 ± 0.7 | 0.0 ± 0.0 | 100 |
| | Flavesone 60 + deltamethrin 0.5 | 100 ± 0.0 | 0.0 ± 0.0 | 100 |
| | Flavesone 60 + deltamethrin 1 | 99.3 ± 0.7 | 0.0 ± 0.0 | 100 |

*Mean ± standard error

Example 5: Combinations of Flavesone and One of Pririmcarb, Dimethoate or Alpha-Cypermethrin and Activity Against Susceptible Populations of Green Peach Aphid

Nature of Work

The green peach aphid (*Myzus persicae*) is an important pest of a variety of crops, particularly due to the aphid's ability to transmit plant viruses. Control of this pest relies heavily on the application of broad-spectrum pesticides. However, resistance in *M. persicae* to multiple chemical classes, including pyrethroids, organophosphates, carbamates and neonicotinoids is commonplace within Australia. The aim of this study was to examine the potential synergy of flavesone in combination with three standard commercial products (pirimicarb (Pirimor), alpha-cypermethrin (Astound Duo) and dimethoate (dimethoate 400)) against an insecticide-susceptible population of *M. persicae.*

Methods

Following the methodology of Belden & Lydy (2000, Environmental Toxicology and Chemistry, 19(9): 2266-2274), two bioassays were used to determine if there was a synergistic effect between flavesone when in combination with various concentrations of pirimicarb, dimethoate, and alpha-cypermethrin, against *M. persicae*. The first bioassay was undertaken to generate dose-response curves for each individual insecticide against *M. persicae* (FIG. 1 (*a-d*)). Concentrations of each insecticide ranged from $1\times10^{-4}$ to 10 times the field rate (Table 20). LC values were calculated from the dose-response curves at 96 hours exposure for each insecticide using a logistic regression model with random effects (Robertson & Preisler 1992, Pesticide Bioassays with Arthropods. CRC: Boca Ratan; Venables & Ripley 2002, Modern Applied Statistic with S, Spring: New York (on the World-Wide Web at: stats.ox.ac.uk/pub/MASS4)). Logistic regression is suited for the analysis of binary response data (i.e. dead/alive) with the random effect component of the model controlling for the non-independence of aphid mortality scores within replicates.

The second bioassay assessed the effect of low concentrations of flavesone on the toxicity of the three standard insecticides. Four concentrations for each insecticide expected to provide approximately 10-60% mortality were chosen. These were tested alone and in combination with flavesone at two concentrations corresponding to the $LC_{15}$ and $LC_{30}$ values (1200 and 1800 mg a.i./L flavesone, respectively).

TABLE 20

Field rates for insecticides to be tested for synergy against *Myzus persicae* using laboratory bioassays

| Insecticide | Active Ingredient | Field Rate | Concentration |
|---|---|---|---|
| Flavecide 500EW | Flavesone 500 g/L | 200 mL/100 L | 10,000 mg a.i./L |
| Pirimor 500WG | Pirimicarb 500 g/kg | 500 g/ha | 2500 mg a.i./L |
| Dimethoate 400 | Dimethoate 400 g/L | 500 mL/100 L | 2000 mg a.i./L |
| Astound Duo | Alpha-cypermethrin 100 g/L | 125 mL/100 L | 125 mg a.i./L |

Bioassays were undertaken following the leaf dip method described in Moores et al. (1994, Pesticide Biochemistry and Physiology, 49, 114-120). Leaf discs (25 mm diameter) cut from bok choi leaves (*Brassica napus chinensis*) were submerged for 1 second in insecticide solution or water (control), and placed adaxial side up on 10 g/L agar in 35 mm petri dishes. Between seven and eight replicate leaf discs were prepared per treatment. Once leaves were air-dry, eight *M. persicae* nymphs from a known insecticide-susceptible population (originally collected from Shepparton, VIC, and maintained in the laboratory since 2002) were transferred to each insecticide-dipped leaf disc using a fine-haired paintbrush. Each petri dish was inverted onto a lid containing a 25 mm diameter filter paper to control humidity and were sealed with parafilm to prevent the aphids escaping. All petri dishes were then placed into an incubator held at 18° C.±2° C. with a photoperiod of 16:8 LD cycle. At 48 and 96 hours, aphids were scored as alive (vibrant and moving freely), dead (not moving over a 5 second period) or incapacitated (inhibited movement). Incapacitated individuals were pooled with dead individuals for analysis as they invariably die and therefore do not contribute to the next generation.

Data Analysis

To determine whether synergistic effects are present when chemicals are mixed, the observed toxicity of the mixture is compared to the predicted joint toxicity taken from knowledge of the toxicity of each individual component (Cedergreen et al. 2013, Toxicity Prediction of Chemical Mixtures. In Encyclopaedia of Environmental Management. Taylor and Francis: New York. Published online: 3 May 2013: 2572-2581). The most widely-established method for predicting joint toxicity of chemical mixtures is Concentration Addition (CA) (Loewe 1926, Archive for Experimental Pathology and Pharmacology, 114: 313-326), and assumes no interaction between components. To calculate the joint toxicity of chemicals using CA, the concentration of each chemical in each mixture was normalized to its individual toxicity, called a toxic unit (TU). A value of 1 TU is assigned to the 50% lethal concentration ($LC_{50}$) value of chemical. The TU values for each chemical component in the mixture are then summed to provide a prediction of the toxicity of the insecticide mixture as follows:

$$TU_{predicted} = \frac{Cw_1}{LC50_1} + \frac{Cw_2}{LC50_2} + \dots + \frac{Cw_i}{LC50_i}$$

Where $Cw_i$ is the concentration of a chemical in a mixture and LC50i is the $LC_{50}$ for the respective chemical from 1 to 5 (Pape-Lindstrom & Lydy 1997, Environmental Toxicology and Chemistry, 16(11): 2415-2420). $LC_{50}$ values for each standard chemical were re-calculated from aphid mortality data for treatments containing only the standard chemicals, after 96 hours exposure. Using logistic regression models, $LC_{50}$ values and accompanying 95% confidence intervals (CI's) were calculated using Fieller's method (Finney 1971, Probit analysis, Cambridge University Press, Cambridge, UK). The $LC_{50}$ value for flavesone calculated from a previous bioassay was used, as two concentrations of a chemical are not sufficient to calculate an $LC_{50}$ value.

The empirically measured toxicity (and 95% CI's) of each mixture was calculated by dividing mortality by 50 to give the observed toxicity ($TU_{observed}$), which was then compared to the predicted toxicity ($TU_{predicted}$). The null hypothesis for the synergy test was that the toxicity of the insecticide mixtures would demonstrate concentration addition (i.e. that the mortality of *M. persicae* observed when exposed to an insecticide mixture would equal that predicted by the toxic unit model). The alternative hypothesis was that exposure to insecticide mixtures would result in either greater than additive responses (synergism or interactive joint toxicity) or less than additive responses (antagonism) (i.e. the 95% CI's of the observed TU of each mixture would not overlap with the predicted TU).

The CA method indicated some mixtures showed greater than additive toxicity. To confirm there was a synergistic effect in these cases, mortality data from the eight replicate petri dishes for that mixture, along with mortality data for flavesone and the standard chemical alone were analysed using a logistic regression model that included an interaction effect between the two insecticides:

$$\log\left(\frac{y}{1-y}\right) = \alpha + \beta_1 Cw_1 + \beta_2 Cw_2 + \gamma(Cw_1 * Cw_2)$$

Where $Cw_1$ is the concentration of the standard insecticide in the mixture. $Cw_2$ is the concentration of flavesone. A significant interaction effect (γ) is demonstration of greater than additive toxicity (Belden & Lydy 2000, referred to above).

All analyses were conducted using R version 3.3.1 (R Development Core Team 2016).

Results

The mortality of *M. persicae* at 96 hours exposure to individual insecticides at the concentrations used in mixtures for synergy tests are shown in Table 21. The $LC_{50}$ values (and 95% CI's) calculated from the mortality responses from these concentrations were 19.7 (17.3-22.4) mg a.i./L for pirimicarb, 526 (420-643) mg a.i./L for dimethoate, and 44.6 (36.2-54.9) mg a.i./L for alpha-cypermethrin. The $LC_{50}$ value for flavesone was previously calculated as 2,731 (2,259-3,303) mg a.i./L.

Figure 2:
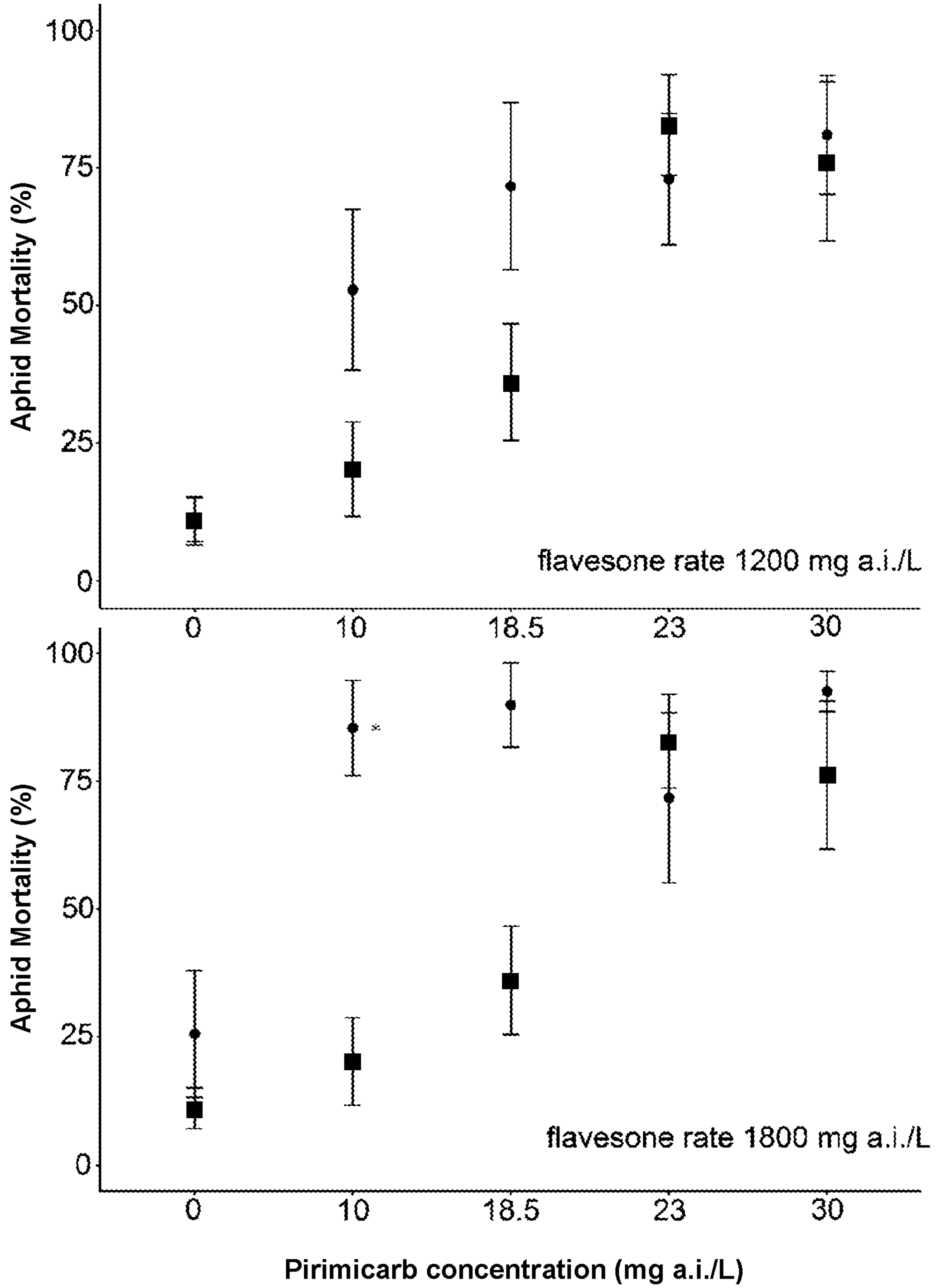
FIG. 2 provides a graphical representation of mean aphid mortality for different mixtures of pirimicarb and flavesone after 96 hours exposure (black circles). Mortality for pirimicarb only at equivalent concentrations are shown with black squares. Error bars show the standard error. A statistically significant synergistic effect based on the logistic regression model is indicated by an asterisk.
Figure 3:
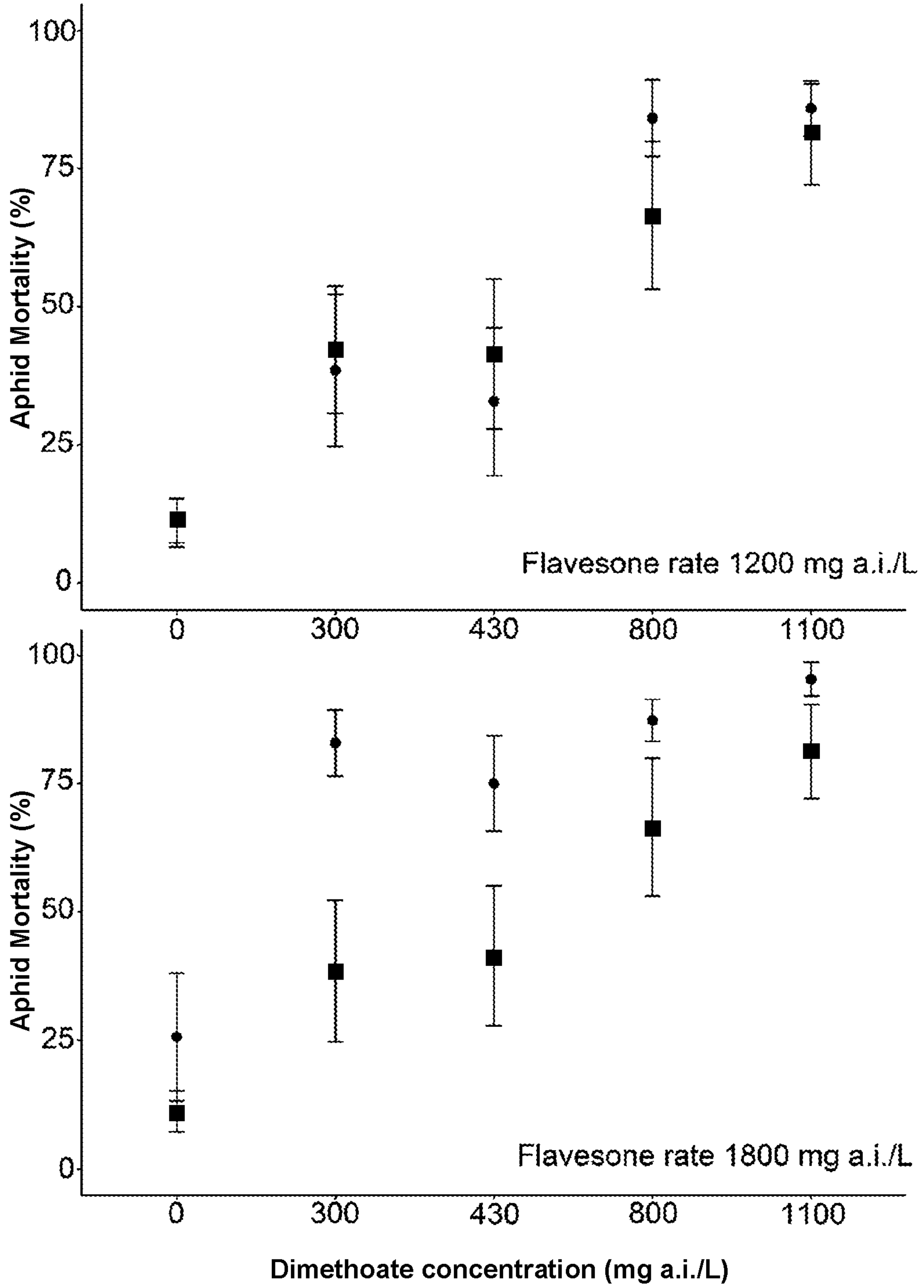
FIG. 3 provides a graphical representation of mean aphid mortality for different mixtures of dimethoate and flavasone after 96 hours exposure (black circles). Mortality for dimethoate only at equivalent concentrations are shown with black squares. Error bars show the standard error.
Figure 4:
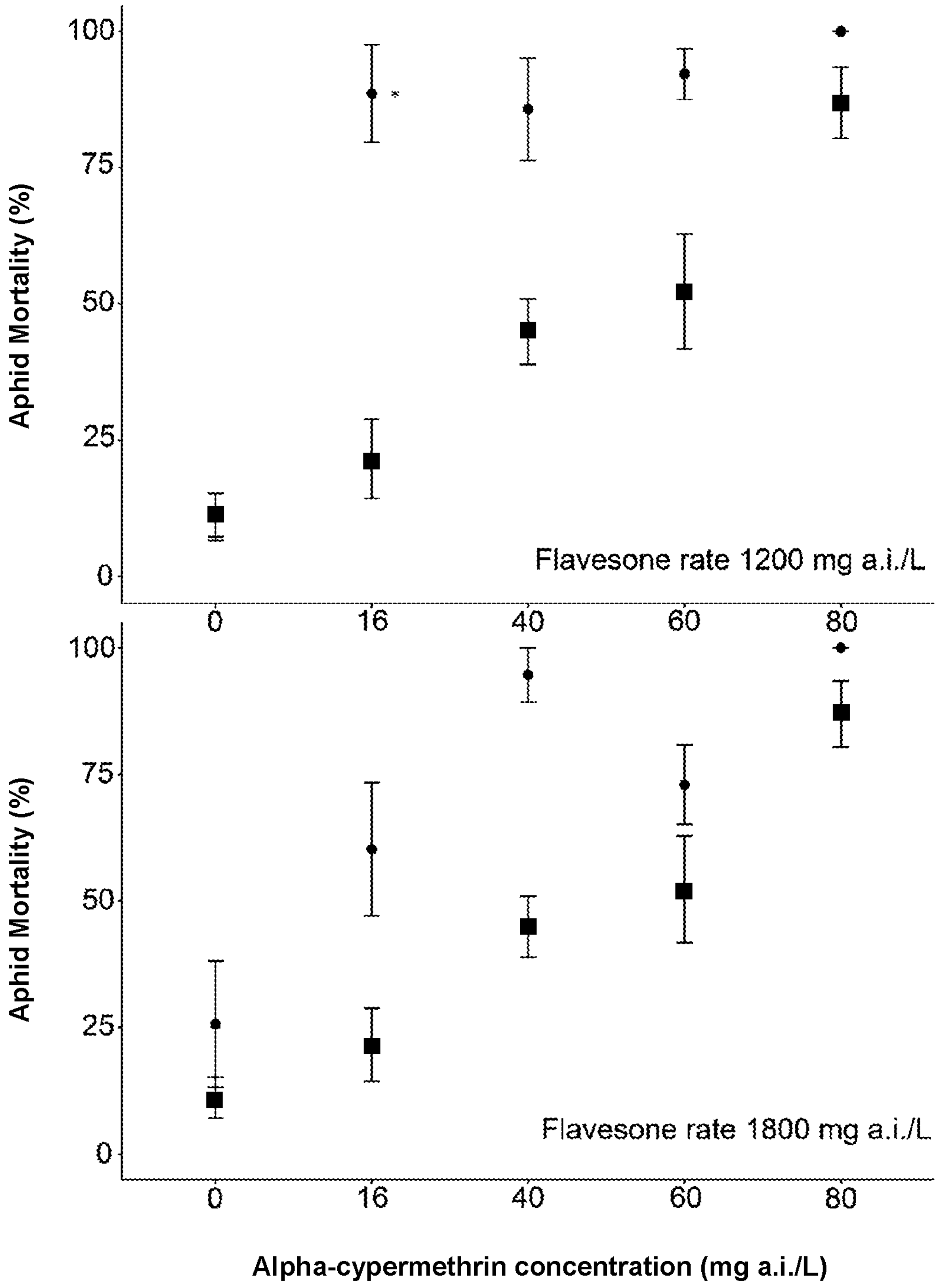
FIG. 4 provides a graphical representation of mean aphid mortality for different mixtures of alpha-cypermethrin and flavesone after 96 hours exposure (black circles). Mortality for alpha-cypermethrin only at equivalent concentrations are shown with black squares. Error bars show the standard error. A statistically significant synergistic effect based on the logistic regression model is indicated by an asterisk.

Mortality after exposure to flavesone in combination with pirimicarb, dimethoate, and alpha-cypermethrin are plotted in black in FIGS. 2-4, respectively. Mortality responses to the same concentrations of each standard insecticide applied alone are plotted with squares.

TABLE 21

Mean aphid mortality for insecticides applied individually at the concentrations used in the mixtures. Standard errors are included in parentheses.

| Insecticide | Concentration (mg a.i./L) | Mortality (%) |
|---|---|---|
| Control | — | 11.2 (3.9) |
| Flavesone | 1200 | 10.9 (4.4) |
| Flavesone | 1800 | 25.7 (12.4) |
| Pirimicarb | 10 | 20.3 (8.5) |
| Pirimicarb | 18.5 | 36.1 (10.6) |
| Pirimicarb | 23 | 82.8 (9.1) |
| Pirimicarb | 30 | 76.2 (14.4) |
| Dimethoate | 300 | 38.4 (13.8) |
| Dimethoate | 430 | 41.4 (13.6) |
| Dimethoate | 800 | 66.5 (13.4) |
| Dimethoate | 1100 | 81.3 (9.1) |
| Alpha-cypermethrin | 16 | 21.6 (7.2) |
| Alpha-cypermethrin | 40 | 44.9 (6.0) |
| Alpha-cypermethrin | 60 | 52.2 (10.6) |
| Alpha-cypermethrin | 80 | 86.9 (6.5) |

The toxicity of each insecticide mixture predicted by the CA method, along with the observed toxicity calculated from the mortality data are shown in Table 22. Insecticide mixtures for which the 95% CI's of the observed TU of each mixture did not overlap with the predicted TU show evidence for synergism and are indicated by an asterisk. For each of the three standard insecticides, the CA method identified at least one mixture combination for which greater than additive toxicity was detected. These synergistic effects were only evident at the lower concentrations of the standard insecticide.

Additional analyses using logistic regression models showed statistically significant interactions between pirimicarb at 10 mg a.i./L and flavesone at 1800 mg a.i./L ($x^2$=4.23, p<0.05), and alpha-cypermethrin at 16 mg a.i./L and flavesone at 1200 mg a.i./L ($x^2$=12.5, p<0.001).

TABLE 22

Responses of *M. persicae* exposed to mixtures of flavesone and various concentrations of three standard insecticides. Mortality was assessed after 96 hours exposure and includes standard errors in parentheses. Predicted toxicity ($TU_{predicted}$) was calculated according to Equation 1, while observed toxicity ($TU_{observed}$) is calculated by dividing mortality by 50. Greater than additive toxicity (synergy) according to the CA method (where the 95% CI's of observed toxicity is greater than the predicted toxicity) is indicated by an asterisk, and of these mixtures, a statistically significant synergistic effect detected by a logistic regression model is indicated by 2 asterisks.

| Standard | Standard (mg a.i./L) | Flavesone (mg a.i./L) | Mortality (%) | $TU_{predicted}$ | $TU_{observed}$ (95% CI's) |
|---|---|---|---|---|---|
| Pirimicarb | 10 | 1200 | 52.9 (14.6) | 0.95 | 1.06 (0.48-1.63) |
| Pirimicarb | 18.5 | 1200 | 71.7 (15.2) | 1.38 | 1.43 (0.84-2) |
| Pirimicarb | 23 | 1200 | 73 (11.9) | 1.61 | 1.46 (0.99-1.93) |
| Pirimicarb | 30 | 1200 | 81 (10.8) | 1.97 | 1.62 (1.2-2) |
| Pirimicarb | 10 | 1800 | 85.4 (9.3) | 1.17 | 1.71 (1.34-2)** |
| Pirimicarb | 18.5 | 1800 | 89.9 (8.3) | 1.60 | 1.8 (1.47-2) |
| Pirimicarb | 23 | 1800 | 71.8 (16.6) | 1.83 | 1.44 (0.78-2) |
| Pirimicarb | 30 | 1800 | 92.6 (3.9) | 2.18 | 1.85 (1.7-2) |
| Dimethoate | 300 | 1200 | 42.2 (11.6) | 1.01 | 0.84 (0.39-1.3) |
| Dimethoate | 430 | 1200 | 32.8 (13.4) | 1.26 | 0.66 (0.13-1.18) |
| Dimethoate | 800 | 1200 | 84.2 (7) | 1.96 | 1.68 (1.41-1.96) |
| Dimethoate | 1100 | 1200 | 85.9 (5) | 2.53 | 1.72 (1.52-1.91) |
| Dimethoate | 300 | 1800 | 82.9 (6.4) | 1.23 | 1.66 (1.41-1.91)* |
| Dimethoate | 430 | 1800 | 75 (9.2) | 1.43 | 1.5 (1.14-1.86) |
| Dimethoate | 800 | 1800 | 87.3 (4.1) | 2.18 | 1.75 (1.58-1.91) |
| Dimethoate | 1100 | 1800 | 95.3 (3.3) | 2.75 | 1.91 (1.78-2) |
| Alpha-cypermethrin | 16 | 1200 | 88.6 (8.9) | 0.80 | 1.77 (1.42-2)** |
| Alpha-cypermethrin | 40 | 1200 | 85.7 (9.4) | 1.34 | 1.71 (1.35-2)* |
| Alpha-cypermethrin | 60 | 1200 | 92.2 (4.7) | 1.78 | 1.84 (1.66-2) |
| Alpha-cypermethrin | 80 | 1200 | 100 (0) | 2.23 | 2.0 (2-2) |

TABLE 22-continued

Responses of *M. persicae* exposed to mixtures of flavesone and various concentrations of three standard insecticides. Mortality was assessed after 96 hours exposure and includes standard errors in parentheses. Predicted toxicity ($TU_{predicted}$) was calculated according to Equation 1, while observed toxicity ($TU_{observed}$) is calculated by dividing mortality by 50. Greater than additive toxicity (synergy) according to the CA method (where the 95% CI's of observed toxicity is greater than the predicted toxicity) is indicated by an asterisk, and of these mixtures, a statistically significant synergistic effect detected by a logistic regression model is indicated by 2 asterisks.

| Standard | Standard (mg a.i./L) | Flavesone (mg a.i./L) | Mortality (%) | $TU_{predicted}$ | $TU_{observed}$ (95% CI's) |
|---|---|---|---|---|---|
| Alpha-cypermethrin | 16 | 1800 | 60.2 (13.2) | 1.02 | 1.2 (0.69-1.72) |
| Alpha-cypermethrin | 40 | 1800 | 94.6 (5.4) | 1.56 | 1.89 (1.68-2)* |
| Alpha-cypermethrin | 60 | 1800 | 72.9 (7.9) | 2.00 | 1.46 (1.15-1.77) |
| Alpha-cypermethrin | 80 | 1800 | 100 (0) | 2.45 | 2.0 (2-2) |

Conclusions: The results of this trial show evidence of a synergistic effect when flavesone is combined with pirimicarb and alpha-cypermethrin at certain concentrations. There was no clear pattern for the concentration of flavesone which exhibited synergy when combined with a standard insecticide, and in this study synergistic effects were only indicated at the lower concentrations of the standard insecticides.

While the CA method highlighted several mixtures for which greater than additive toxicity was detected (including one mixture containing dimethoate), this model does not take into account control mortality greater than 0%. For this reason, the logistic regression model was used to provide a more conservative statistical test for mixtures exhibiting synergy.

Example 5: Mosquito Larval Topical Dose-Mortality Assays to Investigate Synergistic Effects The efficacy of a flavesone formulation against mosquito larvae was investigated together with investigation of the potential for synergistic action of flavesone and one or more technical grade insecticides. Dose-mortality assays were performed to evaluate the toxicity of technical grade insecticide, here the synthetic pyrethroid (SP) permethrin at various concentrations (minimum five dose points) alone and co-administered with flavesone at single point dose was performed. Assays were conducted using L3 larvae of the Liverpool (SP susceptible) and Puerto Rico (SP resistant) strains of the yellow fever mosquito, *Aedes aegypti* maintained in continuous culture at Purdue University, US. Larvae were transferred to a 24 well tissue plate using a wide-bore plastic transfer pipette, 5 larvae per well. The water was gently removed from the well with a 1 mL pipette and an equivalent amount of $ddH_2O$ was added. The appropriate volume of test compound was added to each of the four replicate wells per treatment and the plate gently swirled to ensure uniform mixing. The plate was placed in a test or growth chamber under constant conditions of 22-25° C. and about 75-85% relative humidity on a 12 h light/12 hr dark cycle. Assays were scored for the phenotypic endpoint of death/paralysis at 24, 48 and 72 hours post exposure. Each assay incorporated a positive (flavesone) and negative (vehicle only) control, and minimum of four technical replicates per dose of test chemistry. The data reported here represent three biological replicates.

Pilot assays were first employed to determine dose of flavesone ($LC_{50}$, $LC_{25}$ or $LC_{10}$ dose as determined in previous dose-mortality tests) appropriate for synergism assays. From these studies, it was determined that an $LC_{10}$ dose of flavesone was optimal to capture synergistic action (higher doses had potential to cause 100% mortality of the test mosquito population in combination with SP, thus masking any potential synergism). Dose response curves are provided (FIGS. 5 and 6), together with lethal concentration ($LC_{50}$) data and 95% CL values for insecticide±flavesone (Table 23). The Synergistic Ratio (SR) for insecticide+flavesone combination is also shown and the synergistic action evaluated as per the published studies of Ahmed and Matsumura (2012, Journal of Medical Entomology 49(6):1405-10) and Ahmed and Vogel (2015, Acta Tropica 155:1-5).

TABLE 23

Toxicity of the synthetic pyrethroid, Permethrin following co-administration with Flavesone ($LC_{10}$ dose) to L3 larvae of *Aedes aegypti* Liverpool (SP susceptible) and Puerto Rico (SP resistant) strains at 24 and 48 hours-post exposure. Toxicity is reported as Lethal Concentration ($LC_{50}$) value with 95% Confidence Interval. The Synergistic Ratio (SR) and P-value are shown; n = 3 biological replicates.

| | Permethrin Dose-Mortality | | Permethrin + Flavesone $LC_{10}$ Dose-Mortality | | | |
|---|---|---|---|---|---|---|
| Strain/Time | $LC_{50}$ (ng/ml) (95% CL) | n[a] | $LC_{50}$ (ng/ml) (95% CL) | n[a] | SR[b] | P-value |
| LVP (24 hours) | 26.7 (24.1-29.7) | 720 | 15.5 (14.1-17.0) | 720 | 1.7 | 0.0067 (**) |
| LVP (48 hours) | 24.3 (21.9-27.0) | 720 | 15.4 (14.0-17.0) | 720 | 1.6 | 0.0077 (**) |

TABLE 23-continued

Toxicity of the synthetic pyrethroid, Permethrin following co-administration with Flavesone ($LC_{10}$ dose) to L3 larvae of *Aedes aegypti* Liverpool (SP susceptible) and Puerto Rico (SP resistant) strains at 24 and 48 hours-post exposure. Toxicity is reported as Lethal Concentration ($LC_{50}$) value with 95% Confidence Interval. The Synergistic Ratio (SR) and P-value are shown; n = 3 biological replicates.

| | Permethrin Dose-Mortality | | Permethrin + Flavesone $LC_{10}$ Dose-Mortality | | | |
|---|---|---|---|---|---|---|
| Strain/Time | $LC_{50}$ (ng/ml) (95% CL) | n[a] | $LC_{50}$ (ng/ml) (95% CL) | n[a] | SR[b] | P-value |
| PRS (24 hours) | 279.6 (260.7-299.9) | 720 | 227.3 (174.8-295.6) | 720 | 1.2 | 0.158 (ns) |
| PRS (48 hours) | 230.8 (215.3-247.5) | 720 | 217.3 (127.3-370.8 | 720 | 1.1 | 0.6265 (ns) |

n[a] total number larvae per n = 3 biological replicates
SR, Synergistc Ratio;
$LC_{50}$ Permethrin/$LC_{50}$ Permethin + Flavesone
P-value; calculated via t-test and SR values,
** p < 0.01

Results

Figure 5A:
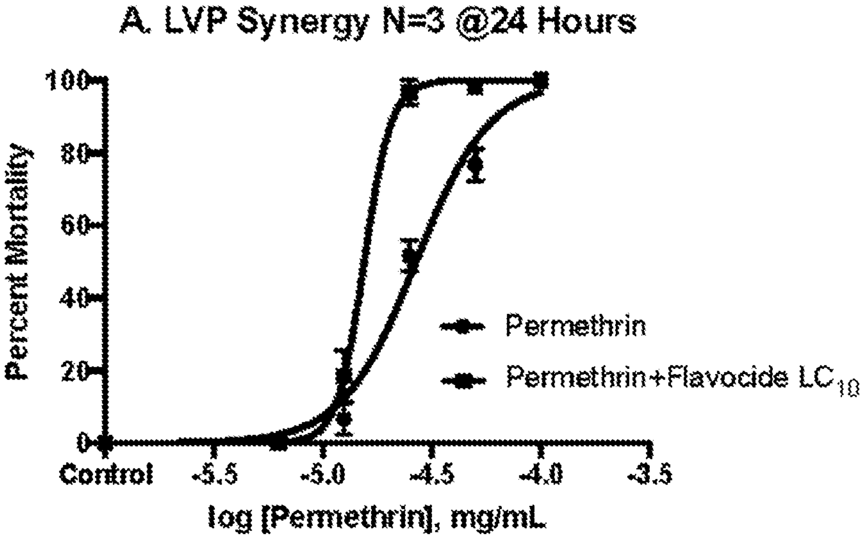
FIG. 5 provides graphical representations of dose mortality assays assessing synergistic interaction between the synthetic pyrethroid (SP) permethrin alone (5 dose points, circles) and in combination with flavesone at a single $LC_{10}$ dose point (squares) against *Aedes aegypti* L3 Liverpool (LVP) SP susceptible strain at (A) 24 and (B) 48 hours post treatment.
Figure 5B:
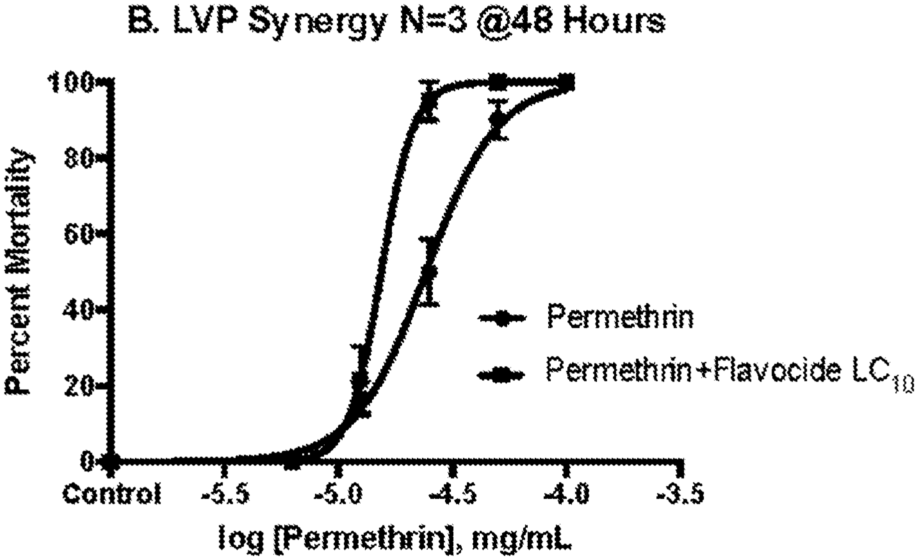
Figure 5C:
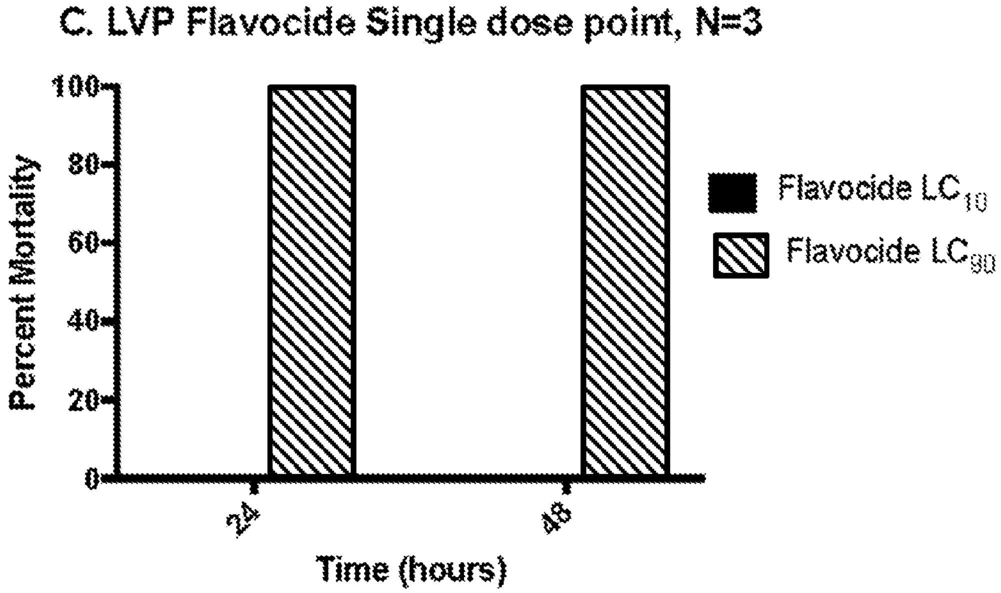
Figure 6A:
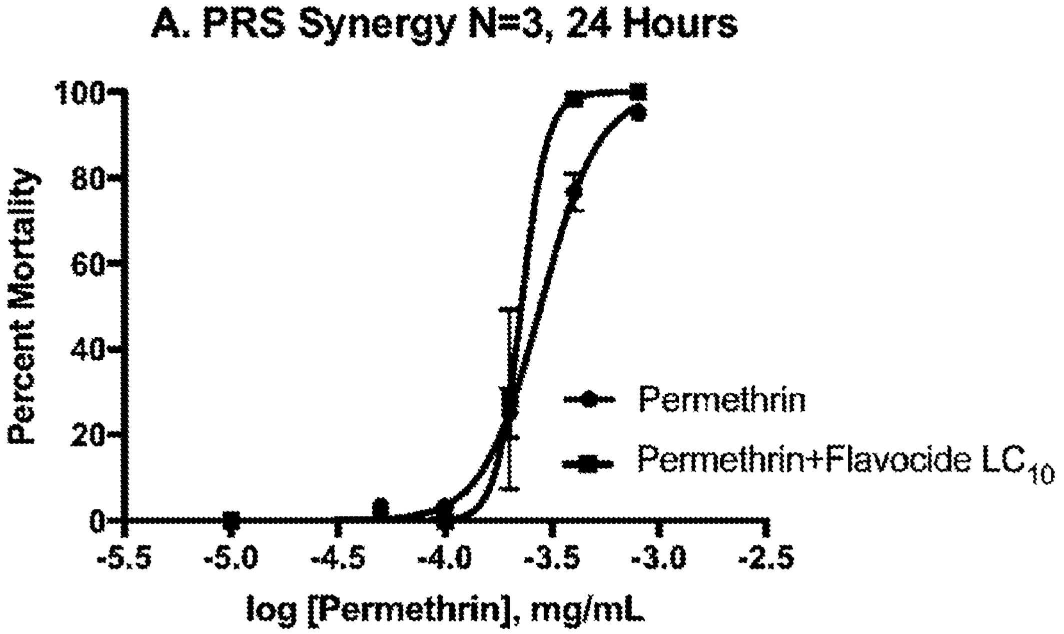
FIG. 6 provides graphical representations of dose mortality assays assessing synergistic interaction between the synthetic pyrethroid (SP) permethrin alone (5 dose points, circles) and in combination with flavesone at a single $LC_{10}$ dose point (squares) against *Aedes aegypti* L3 Puerto Rico (PRS) SP resistant strain at (A) 24 and (B) 48 hours post treatment.
Figure 6B:
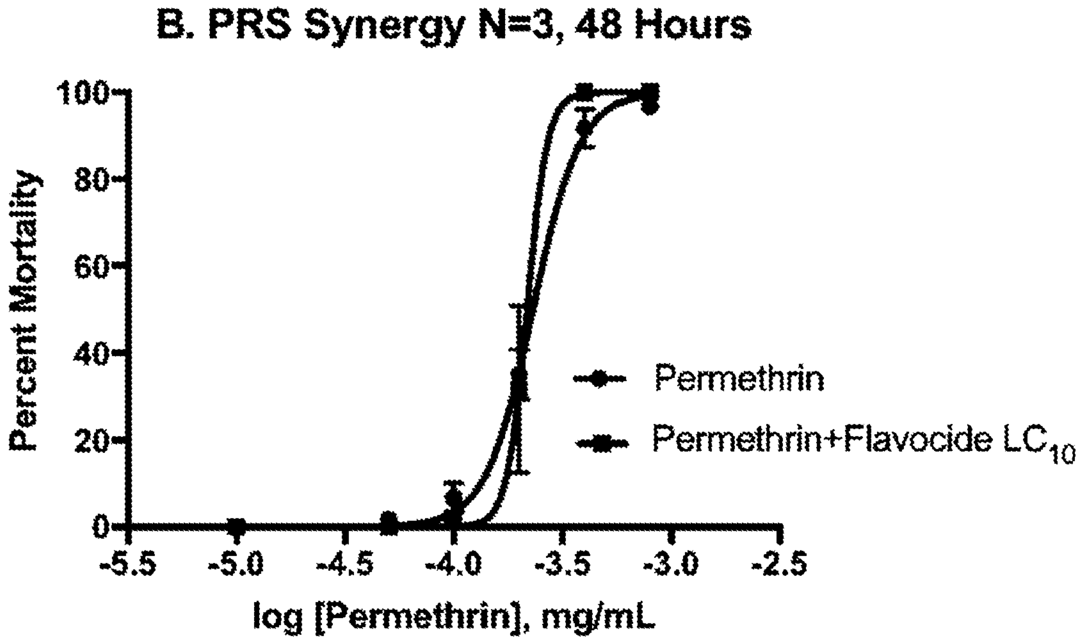
Figure 6C:
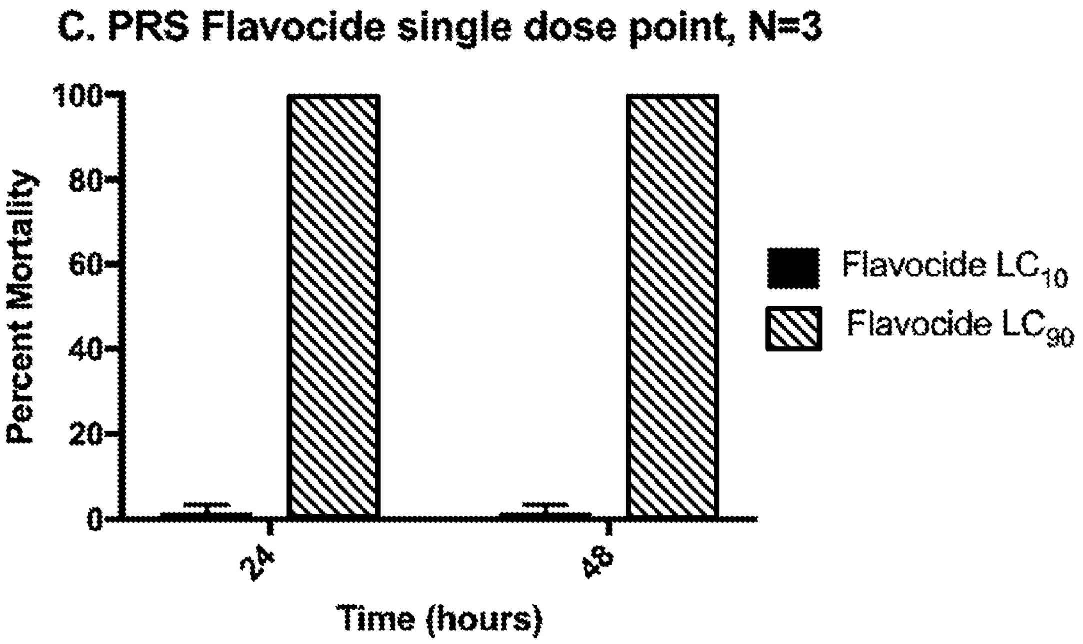

The co-administration of flavesone at an $LC_{10}$ dose with the SP, Permethrin, reduced the $LC_{50}$ value at 24 and 48 hours post-exposure to test chemistries as opposed to administration of Permethrin alone (FIGS. 5, 6; Table 23). There was leftward shift (squares; Permethrin+flavesone) of dose-response curve in FIGS. 5 and 6. This effect was observed in both SP+flavesone treated SP susceptible (Liverpool, LVP) and SP-resistant (Puerto Rico, PRS) mosquito strains, but was more pronounced for the Liverpool strain. There was also a higher $LC_{50}$ dose obtained with the Puerto Rico strain larvae (Table 23) reflecting an approximately 10-fold level of resistance to Permethrin in this strain as compared to Liverpool strain larvae. Taken together, these data suggest that low doses of flavesone could extend the utility of commercial SP.

The data provide support for synergistic activity between Permethrin and flavesone at 24 and 48 hours against the Liverpool (SP susceptible) strain (p<0.01). Under the conditions employed here ($LC_{10}$ flavesone dose), the data support a combinatorial effect against the Puerto Rico (SP-resistant) strain. This observation may reflect the low flavesone dose used in the experiment or the involvement of pathways associated with the voltage-gated sodium channel and/or cytochrome P450 metabolism in synergistic action (both mechanisms have been reported in the PRS strain). Further studies using higher doses of flavesone might reveal synergistic activity involving the PRS strain. These results suggest that low doses of flavesone could act synergistically with SP insecticides such as Permethrin and extend the utility of this class against SP-susceptible insects.

As in previous studies, it was observed that the addition of flavesone resulted in an unambiguous "lethal" larval phenotype (larvae unresponsive at the bottom of wells in plate), as opposed to Permethrin treated larvae that may recover activity following exposure at sub-lethal dose.

The claims defining the invention are as follows:

1. A method of causing mortality of insecticide-susceptible insect pests of the order Diptera, comprising exposing the pests to a synergistic combination of flavesone and at least one second pesticide, wherein the at least one second pesticide is at least one insecticide selected from the group consisting of permethrin and pyrethrin, wherein the amount of the compound used is between an $LC_{10}$ and an $LC_{30}$ amount and the amount of the second pesticide used is up to an $LC_{50}$ amount, and wherein the synergistic combination leads to a synergistic increase in mortality of the insecticide-susceptible insect pests of the order Diptera.

2. The method according to claim 1 wherein the insect is a *Musca* species, an *Aedes* species or a *Culex* species.

3. The method according to claim 2 where in the insect is selected from the group consisting of *Musca domestica, Aedes aegypti, Aedes vexans, Culex pipiens* and *Culex* qunque *fasciatus.*

4. The method according to claim 1, wherein the amount of the compound is between an $LC_{10}$ and an $LC_{20}$ amount.

5. The method according to claim 4, wherein the amount of the second pesticide is an $LC_{50}$ amount.

6. The method according to claim 5, wherein the amount of the compound is about an $LC_{10}$ amount.

7. The method according to claim 1, wherein the combination is formulated as a spray and deployed into air of an environment.

8. The method according to claim 1, wherein the combination is formulated as a spray and deployed on a surface in an environment.

9. A method of causing mortality of insecticide-susceptible insect pests of the order Diptera, comprising exposing the pests to a combination of: flavesone and at least one second pesticide, wherein the at least one second pesticide is at least one insecticide selected from the group consisting of permethrin and pyrethrin, wherein the amount of the compound used is between an $LC_{10}$ and an $LC_{30}$ amount and the amount of the second pesticide used is up to an $LC_{50}$ amount, wherein the synergistic combination leads to a synergistic increase in mortality of the insecticide-susceptible insect pests of the order Diptera, and wherein the combination is formulated as a spray and deployed into air of an environment.

10. The method according to claim 9 wherein the insect is a *Musca* species, an *Aedes* species or a *Culex* species.

11. The method according to claim 10 where in the insect is selected from the group consisting of *Musca domestica, Aedes aegypti, Aedes vexans, Culex pipiens* and *Culex* qunque *fasciatus.*

12. The method according to claim 9, wherein the amount of the compound is between about an $LC_{10}$ amount and about an $LC_{20}$ amount.

13. The method according to claim 12, wherein the amount of the second pesticide is about an $LC_{50}$ amount.

14. The method according to claim 13, wherein the amount of the compound is about an $LC_{10}$ amount.

* * * * *